US012704848B2

(12) United States Patent
Patel et al.

(10) Patent No.: US 12,704,848 B2
(45) Date of Patent: Aug. 11, 2026

(54) VEHICLE CONTROL LOOPS AND INTERFACES

(71) Applicant: Skyryse, Inc., El Segundo, CA (US)

(72) Inventors: Rushabh Chandrakant Patel, El Segundo, CA (US); Mark Daniel Groden, Marina Del Rey, CA (US); Chad Bickel, El Segundo, CA (US); Liam Brogan, El Segundo, CA (US)

(73) Assignee: Skyryse, Inc., El Segundo, CA (US)

( * ) Notice: Subject to any disclaimer, the term of this patent is extended or adjusted under 35 U.S.C. 154(b) by 109 days.

(21) Appl. No.: 18/495,679

(22) Filed: Oct. 26, 2023

(65) Prior Publication Data

US 2024/0053770 A1 Feb. 15, 2024

Related U.S. Application Data

(63) Continuation-in-part of application No. 17/370,415, filed on Jul. 8, 2021, now Pat. No. 11,874,674.

(60) Provisional application No. 63/580,318, filed on Sep. 1, 2023, provisional application No. 63/419,953, filed on Oct. 27, 2022, provisional application No. 63/059,491, filed on Jul. 31, 2020, provisional (Continued)

(51) Int. Cl.
*G05D 1/00* (2024.01)
*B64D 45/00* (2006.01)

(52) U.S. Cl.
CPC ........... *G05D 1/0816* (2013.01); *B64D 45/00* (2013.01); *B64D 2045/0085* (2013.01)

(58) Field of Classification Search
CPC .................................................... G05D 1/0816
See application file for complete search history.

(56) References Cited

U.S. PATENT DOCUMENTS 9,235,212 B2 * 1/2016 Bruemmer ........... G05D 1/0289
9,334,052 B2 * 5/2016 Pasko ................. G05D 1/0005

(Continued)

FOREIGN PATENT DOCUMENTS

WO WO-2015003767 A1 1/2015
WO WO-2018217210 A1 11/2018

OTHER PUBLICATIONS

PCT International Search Report and Written Opinion, PCT Application No. PCT/US2021/040889, Oct. 13, 2021, 17 pages.

(Continued)

*Primary Examiner* — Michael A Berns
(74) *Attorney, Agent, or Firm* — Fenwick & West LLP

(57) ABSTRACT

Embodiments relate to an aircraft control and interface system configured to adaptively control an aircraft according to different flight states by modifying one or more processing control loops. The system receives sensor data from one or more sensors of the aircraft. The system determines, from the sensor data, a component of the aircraft is compromised. The system determines the aircraft is in a degraded flight state due to the compromised component. The system operates the aircraft according to the degraded flight state, wherein operating the aircraft according to the degraded flight state includes: (a) modifying one or more processing loops based on the degraded flight state and (b) generating an actuator command by applying the degraded flight state and a signal based on an input from a vehicle control interface to the modified one or more processing loops.

20 Claims, 18 Drawing Sheets

Related U.S. Application Data application No. 63/049,553, filed on Jul. 8, 2020, provisional application No. 63/049,567, filed on Jul. 8, 2020.

(56) References Cited

U.S. PATENT DOCUMENTS 9,658,619 B1 5/2017 Bethke et al.
9,849,044 B1 12/2017 Groden et al.
10,059,439 B2 * 8/2018 Gillett ..................... B64C 13/44
10,173,681 B2 1/2019 Baum et al.
10,535,272 B2 * 1/2020 Groden .................. G05D 1/854
10,691,140 B2 * 6/2020 Kim ...................... B64C 13/503
10,824,141 B2 * 11/2020 Chen ...................... G05D 1/689
10,843,796 B2 * 11/2020 Marvin ............... B64C 13/0421
10,921,826 B2 2/2021 Groden et al.
10,935,985 B2 3/2021 Irwin et al.
11,538,203 B2 12/2022 Holder et al.
11,794,916 B2 * 10/2023 Mark ..................... B64D 27/33
11,874,674 B2 * 1/2024 Groden .................... G08G 5/55
12,380,658 B2 * 8/2025 Powers ................... G06F 3/012
12,524,021 B2 * 1/2026 Dadkhah Tehrani ........................ G05D 1/0055
2014/0027565 A1 1/2014 Marvin et al.
2014/0052293 A1 2/2014 Bruemmer et al.
2015/0336668 A1 11/2015 Pasko et al.
2017/0017241 A1 1/2017 Gillett et al.
2019/0004542 A1 1/2019 Kim
2019/0033862 A1 1/2019 Groden et al.
2019/0064794 A1 2/2019 Chen
2019/0317529 A1 10/2019 Matus et al.
2020/0090524 A1 3/2020 Cherepinsky et al.
2021/0354840 A1 11/2021 Mark et al.
2022/0011783 A1 1/2022 Groden et al.
2022/0326704 A1 10/2022 Moy et al.
2024/0053770 A1 * 2/2024 Patel ........................ G05D 1/82
2024/0201693 A1 6/2024 Groden et al.

OTHER PUBLICATIONS

PCT International Search Report and Written Opinion, PCT Application No. PCT/US23/36046, Jan. 31, 2024, 15 pages.
United States Office Action, U.S. Appl. No. 17/370,415, Apr. 4, 2023, 34 pages.
United States Office Action, U.S. Appl. No. 18/523,216, Feb. 21, 2025, 12 pages.

* cited by examiner

400

700

710

Generate, using the aircraft control inputs, a plurality of trajectory values for axes of movement of the aircraft, the plurality of trajectory values corresponding to the requested trajectory

720

Generate, using information describing characteristics of the aircraft and the plurality of trajectory values, a plurality of actuator commands for a plurality of actuators of the aircraft

730

Transmit the plurality of actuators commands to corresponding actuators to adjust a current trajectory of the aircraft to the requested trajectory

740

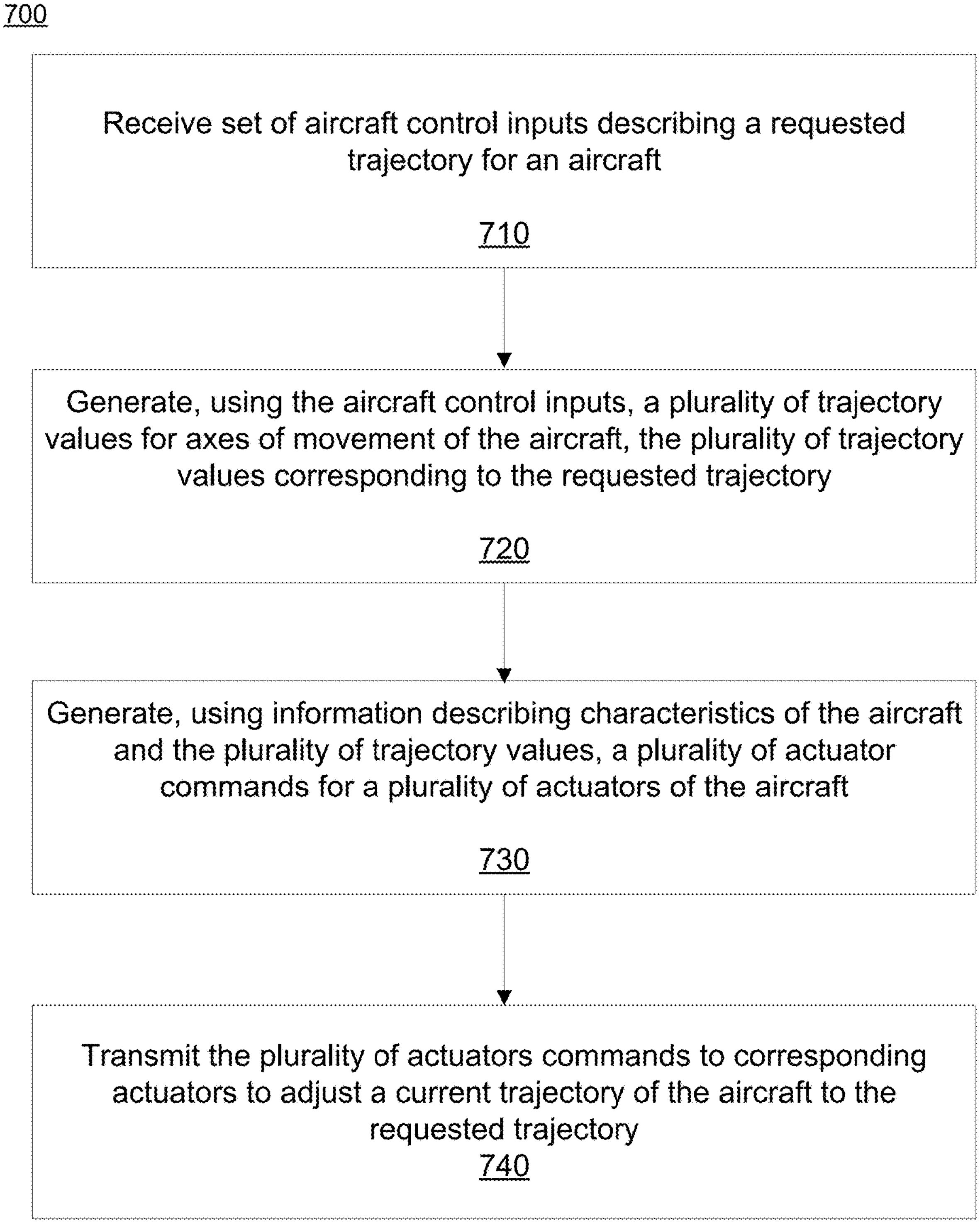

*FIG. 7*

| | Ground state | Pickup/Setdown state | Auto Hover state | Pilot state | Autorotation state |
|---|---|---|---|---|---|
| **gncstateType** Integer Value | 0 | 1 | 2 | 3 | 4 |
| **gncstateType** Enumerated Value | gncstate.GROUND | gnc.state.PICKUP_SETDOWN | gnc.state.AUTO_HOVER | gnc.state.PILOT | gnc.state.AUTOROTATION |
| Flight Condition(s) | Skids on ground only, full WoW | Skids on ground to auto hover stationkeeping | Auto hover stationkeeping only | Full envelope hover/taxi to forward flight | Engine out, full envelope |
| Clutch engagement allowed? | Yes | No | Yes | Yes (sim only) | No |
| Description | Default startup state, skids on ground, serves ground position, and GNC disabled | Active during pickup/ setdown maneuver, or on ground when pickup maneuver ready to be enabled by pilot. | Auto hover station-keeping position hold state. Used for transitions between pickup/setdown and pilot states. | Normal piloted full-envelope flight state. | Contingency state that is auto activated upon engine out detection. |

*FIG. 10*

*FIG. 15*
ETA 00:18 H:M
Engine Power
105%
77°F
Stick
Touch
AutoFlight
SPEED
HEADING
ALTITUDE
Alerts
Envelope
Protection
Disabled
Speed Select
Altitude Select
75 kts
1000
125
100
2400
2600
2500
2300
2200
-500
101
102
N2
%RPM
R
Torque
112
MGT
783
100
094°
TAS 102
GS 100
-200 FPM
29.92
1600
Wind Info
031°/10
NAV 1
VOR
HDG Sel
270°
CRS Sel
094°
Fly FlightPlan
Lateral
Vertical
110
75
54.4
Oil Press
Oil Temp
Fuel Qty
Main Bus
25.2 V
Generator
150 A

1610 Receiving sensor data from one or more sensors of the aircraft

1620 Determine a component of the aircraft is compromised

1630 Determine the aircraft is in a degraded flight state due to the compromised component 1640 Operate the aircraft according to the degraded flight state:

modify one or more processing loops based on the degraded flight state generate an actuator command by applying the degraded flight state and a signal based on an input from a vehicle control interface to the modified one or more processing loops

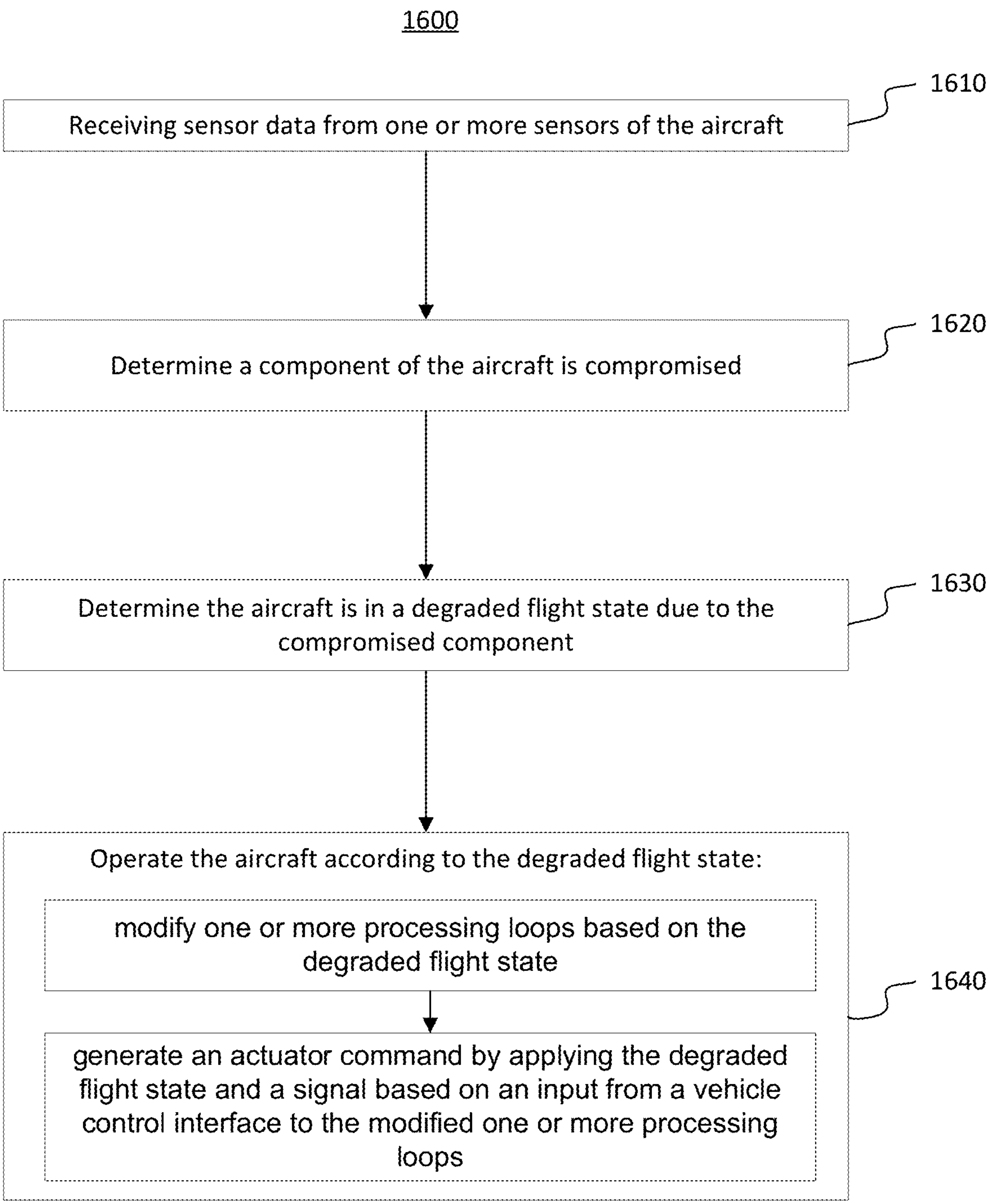

FIG. 16

VEHICLE CONTROL LOOPS AND INTERFACES

CROSS REFERENCE TO RELATED APPLICATIONS

This application is a continuation-in-part of pending U.S. application Ser. No. 17/370,415, filed Jul. 8, 2021, titled "Vehicle Control and Interface System," which claims the benefit of U.S. Provisional Application No. 63/049,553, filed Jul. 8, 2020, U.S. Provisional Application No. 63/049,567, filed Jul. 8, 2020, and U.S. Provisional Application No. 63/059,491, filed Jul. 31, 2020, each of which is incorporated by reference herein in its entirety.

Additionally, this application claims the benefit of U.S. Provisional Application No. 63/419,953, filed Oct. 27, 2022, titled "System For Improved Vehicle Control Loops and Interfaces" and U.S. Provisional Application No. 63/580,318, filed Sep. 1, 2023, titled "Guidance, Navigation, and Control (GNC) System For Air Vehicle," each of which is incorporated by reference herein in its entirety.

TECHNICAL FIELD

The disclosure generally relates to the field of vehicle control systems.

BACKGROUND

Stabilizing a flying vehicle, such as a rotorcraft or fixed-wing aircraft is a non-intuitive task. Stabilizing a rotorcraft, for example, is especially difficult. Without complete visibility, even a very-well trained pilot may become disoriented, confusing up with down, and the pilot's perceptions will lag behind the necessary inputs to maintain stable level flight. A pilot may typically need to make several adjustments per second to maintain stable level flight and may need to look at several measurements to stay within the flight envelope of the aircraft.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7 is a flow diagram illustrating one example embodiment of a process for generating actuator commands for aircraft control inputs via an aircraft control router.

FIG. 10 is a table of flight states, according to some embodiments.

FIG. 16 is a flow diagram illustrating a process for operating an aircraft flying through an environment, according to one or more embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments relate to an aircraft control and interface system configured to adaptively control an aircraft according to different flight states by modifying one or more processing control loops. The system receives sensor data from one or more sensors of the aircraft. The system determines, from the sensor data, a component of the aircraft is compromised. The system determines the aircraft is in a degraded flight state due to the compromised component. The system operates the aircraft according to the degraded flight state, wherein operating the aircraft according to the degraded flight state includes: (a) modifying one or more processing loops based on the degraded flight state and (b) generating an actuator command by applying the degraded flight state and a signal based on an input from a vehicle control interface to the modified one or more processing loops.

Example System Environment

Figure 1:
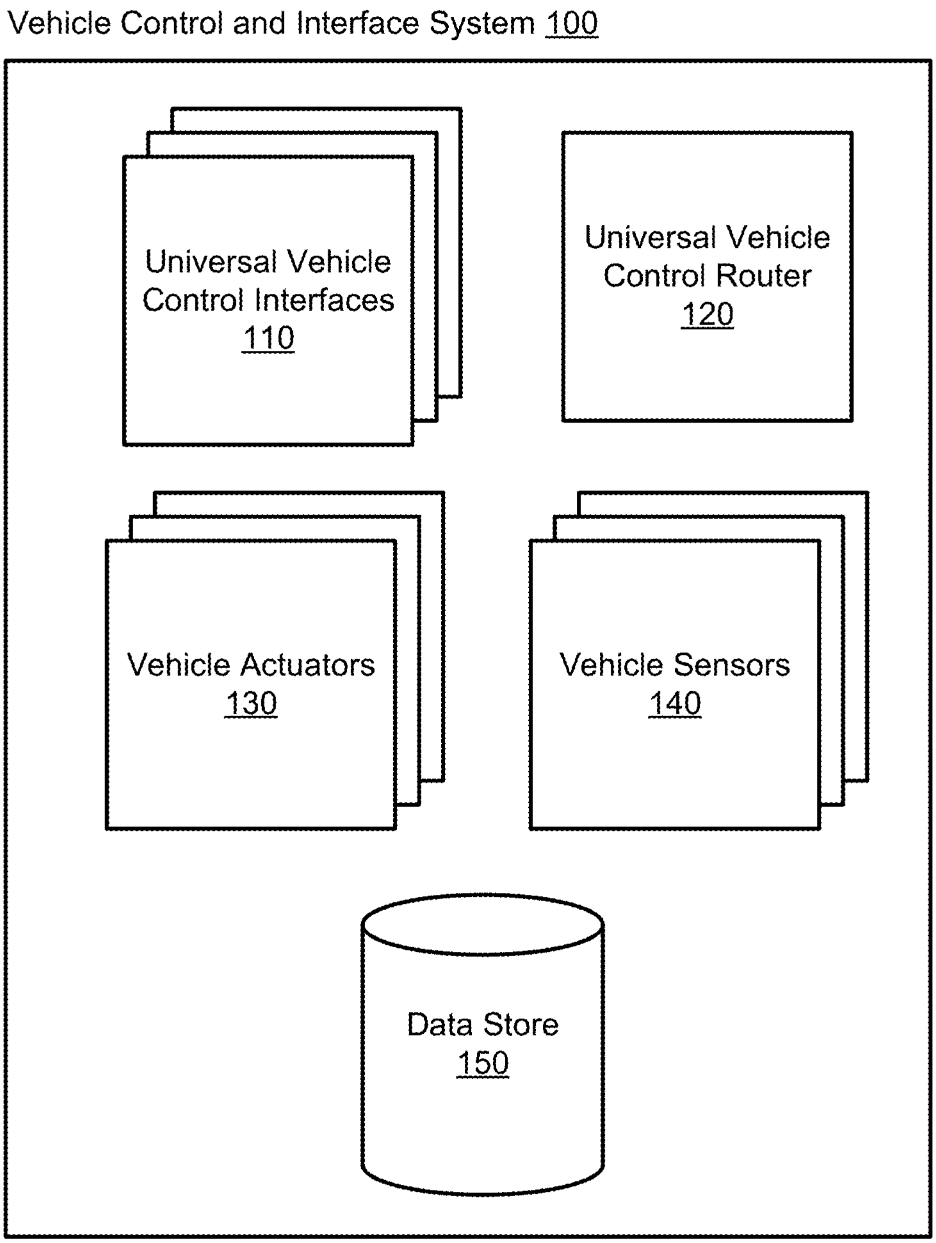
FIG. 1 illustrates one example embodiment of a vehicle control and interface system.

Figure (FIG. 1 illustrates one example embodiment of a vehicle control and interface system 100. In the example embodiment shown, vehicle control and interface system 100 includes one or more universal vehicle control interfaces 110, universal vehicle control router 120, one or more vehicle actuators 130, one or more vehicle sensors 140, and one or more data stores 150. In other embodiments, the vehicle control and interface system 100 may include different or additional elements. Furthermore, the functionality may be distributed among the elements in a different manner than described. The elements of FIG. 1 may include one or more computers that communicate via a network or other suitable communication method.

The vehicle control and interface system 100 may be integrated with various vehicles having different mechanical, hardware, or software components. For example, the vehicle control and interface system 100 may be integrated with fixed-wing aircraft (e.g., airplanes), rotorcraft (e.g., helicopters), motor vehicles (e.g., automobiles), watercraft (e.g., power boats or submarines), or any other suitable vehicle. As described in greater detail below with reference to FIGS. 1-8, the vehicle control and interface system 100 is advantageously configured to receive inputs for requested operation of a particular vehicle via universal set of interfaces and the inputs to appropriate instructions for mechanical, hardware, or software components of the particular vehicle to achieve the requested operation. In doing so, the vehicle control and interface system 100 enables human operators to operate different vehicles using the same universal set of interfaces or inputs. By way of example, "universal" indicates that a feature of the vehicle control and interface system 100 may operate or be architected in a vehicle-agnostic manner. This allows for vehicle integration without necessarily having to design and configure vehicle specific customizations or reconfigurations in order to integrate the specific feature. Although universal features of the vehicle control and interface system 100 can function in a vehicle-agnostic manner, the universal features may still be configured for particular contexts. For example, the vehicle control or interface system 100 may receive or process inputs describing three-dimensional movements for vehicles that can move in three dimensions (e.g., aircraft) and conversely may receive or process inputs describing two-dimensional movements for vehicles that can move in two dimensions (e.g., automobiles). One skilled in the art will appreciate that other context-dependent configurations of universal features of the vehicle control and interface system 100 are possible.

The universal vehicle control interfaces 110 is a set of universal interfaces configured to receive a set of universal vehicle control inputs to the vehicle control and interface system 100. The universal vehicle control interfaces 110 may include one or more digital user interfaces presented to an operator of a vehicle via one or more electronic displays. Additionally, or alternatively, the universal vehicle control interfaces 110 may include one or more hardware input devices, e.g., one or more control sticks inceptors, such as side sticks, center sticks, throttles, cyclic controllers, or collective controllers. The universal vehicle control interfaces 110 receive universal vehicle control inputs requesting operation of a vehicle. In particular, the inputs received by the universal vehicle control interfaces 110 may describe a requested trajectory of the vehicle, such as to change a velocity of the vehicle in one or more dimensions or to change an orientation of the vehicle. Because the universal vehicle control inputs describe an intended trajectory of a vehicle directly rather than describing vehicle-specific precursor values for achieving the intended trajectory, such as vehicle attitude inputs (e.g., power, lift, pitch, roll yaw), the universal vehicle control inputs can be used to universally describe a trajectory of any vehicle. This is in contrast to existing systems where control inputs are received as vehicle-specific trajectory precursor values that are specific to the particular vehicle. Advantageously, any individual interface of the set of universal vehicle control interfaces 110 configured to received universal vehicle control inputs can be used to completely control a trajectory of a vehicle. This is in contrast to conventional systems, where vehicle trajectory must be controlled using two or more interfaces or inceptors that correspond to different axes of movement or vehicle actuators. For instance, conventional rotorcraft systems include different cyclic (controlling pitch and roll), collective (controlling heave), and pedal (controlling yaw) inceptors. Similarly, conventional fixed-wing aircraft systems include different stick or yoke (controlling pitch and role), power (controlling forward movement), and pedal (controlling yaw) inceptors. Example configurations of the universal vehicle control interfaces 110 are described in greater detail below with reference to FIGS. 2-5 and 6A-D.

In various embodiments, inputs received by the universal vehicle control interfaces 110 can include "steady-hold" inputs, which may be configured to hold a parameter value fixed (e.g., remain in a departed position) without a continuous operator input. Such variants can enable hands-free operation, where discontinuous or discrete inputs can result in a fixed or continuous input. In a specific example, a user of the universal vehicle control interfaces 110 can provide an input (e.g., a speed input) and subsequently remove their hands with the input remaining fixed. Alternatively, or additionally, inputs received by the universal vehicle control interfaces 110 can include one or more self-centering or automatic return inputs, which return to a default state without a continuous user input.

In some embodiments, the universal vehicle control interfaces 110 include interfaces that provide feedback information to an operator of the vehicle. For instance, the universal vehicle control interfaces 110 may provide information describing a state of a vehicle integrated with the universal vehicle control interfaces 110 (e.g., current vehicle speed, direction, orientation, location, etc.). Additionally, or alternatively, the universal vehicle control interfaces 110 may provide information to facilitate navigation or other operations of a vehicle, such as visualizations of maps, terrain, or other environmental features around the vehicle. Embodiments of interfaces providing feedback information to an operator of a vehicle are described in greater detail below with reference to FIGS. 6A-C.

The universal vehicle control router 120 routes universal vehicle control inputs describing operation of a vehicle to components of the vehicle suitable for executing the operation. In particular, the universal vehicle control router 120 receives universal vehicle control inputs describing the operation of the vehicle, processes the inputs using information describing characteristics of the aircraft, and outputs a corresponding set of commands for actuators of the vehicle (e.g., the vehicle actuators 130) suitable to achieve the operation. The universal vehicle control router 120 may use various information describing characteristics of a vehicle in order to convert universal vehicle control inputs to a suitable set of commands for actuators of the vehicle. Additionally, or alternatively, the universal vehicle control router 120 may convert universal vehicle control inputs to a set of actuator commands using a set of control laws that enforce constraints (e.g., limits) on operations requested by the universal control inputs. For example, the set of control laws may include velocity limits (e.g., to prevent stalling in fixed-wing aircraft), acceleration limits, turning rate limits, engine power limits, rotor revolution per minute (RPM) limits, load power limits, allowable descent altitude limits, etc. After determining a set of actuator commands, the universal vehicle control router 120 may transmit the commands to relevant components of the vehicle for causing corresponding actuators to execute the commands. Embodiments of the universal vehicle control router 120 are described in greater detail below with reference to FIG. 3.

The universal vehicle control router 120 can decouple axes of movement for a vehicle in order to process received universal vehicle control inputs. In particular, the universal vehicle control router 120 can process a received universal vehicle control input for one axis of movement without impacting other axes of movement such that the other axes of movement remain constant. In this way, the universal vehicle control router 120 can facilitate "steady-hold" vehicle control inputs, as described above with reference to the universal vehicle control interfaces 110. This is in contrast to conventional systems, where a vehicle operator must manually coordinate all axes of movement independently for a vehicle in order to produce movement in one axis (e.g., a pure turn, a pure altitude climb, a pure forward acceleration, etc.) without affecting the other axes of movement.

In some embodiments, the universal vehicle control router 120 is configured to use one or more models corresponding to a particular vehicle to convert universal vehicle control inputs to a suitable set of commands for actuators of the vehicle. For example, a model may include a set of parameters (e.g., numerical values) that can be used as input to universal input conversion processes in order to generate actuator commands suitable for a particular vehicle. In this way, the universal vehicle control router 120 can be integrated with vehicles by substituting models used by processes of the universal vehicle control router 120, enabling efficient integration of the vehicle control and interface system 100 with different vehicles. The one or more models may be obtained by the universal vehicle control router 120 from a vehicle model database or other first-party or third-party system, e.g., via a network. In some cases, the one or more models may be static after integration with the vehicle control and interface system 100, such as if a vehicle integrated with the vehicle control and interface system 100 receives is certified for operation by a certifying authority (e.g., the United States Federal Aviation Administration). In some embodiments, parameters of the one or more models are determined by measuring data during real or simulated operation of a corresponding vehicle and fitting the measured data to the one or more models.

In some embodiments, the universal vehicle control router 120 processes universal vehicle control inputs according to a current phase of operation of the vehicle. For instance, if the vehicle is a rotorcraft, the universal vehicle control router 120 may convert a universal input describing an increase in lateral speed to one or more actuator commands differently if the rotorcraft is in a hover phase or in a forward flight phase. In particular, in processing the lateral speed increase universal input the universal vehicle control router 120 may generate actuator commands causing the rotorcraft to strafe if the rotorcraft is hovering and causing the rotorcraft to turn if the rotorcraft is in forward flight. As another example, in processing a turn speed increase universal input the universal vehicle control router 120 may generate actuator commands causing the rotorcraft to perform a pedal turn if the rotorcraft is hovering and ignore the turn speed increase universal input if the rotorcraft is in another phase of operation. As a similar example for a fixed-wing aircraft, in processing a turn speed increase universal input the universal vehicle control router 120 may generate actuator commands causing the fixed-wing aircraft to perform tight ground turn if the fixed-wing aircraft is grounded and ignore the turn speed increase universal input if the fixed-wing aircraft is in another phase of operation. One skilled in the art will appreciate that the universal vehicle control router 120 may perform other suitable processing of universal vehicle control inputs to generate actuator commands in consideration of vehicle operation phases for various vehicles.

The vehicle actuators 130 are one or more actuators configured to control components of a vehicle integrated with the universal vehicle control interfaces 110. For instance, the vehicle actuators may include actuators for controlling a power-plant of the vehicle (e.g., an engine). Furthermore, the vehicle actuators 130 may vary depending on the particular vehicle. For example, if the vehicle is a rotorcraft the vehicle actuators 130 may include actuators for controlling lateral cyclic, longitudinal cyclic, collective, and pedal controllers of the rotorcraft. As another example, if the vehicle is a fixed-wing aircraft the vehicle actuators 130 may include actuators for controlling a rudder, elevator, ailerons, and power-plant of the fixed-wing aircraft.

The vehicle sensors 140 are sensors configured to capture corresponding sensor data. In various embodiments the vehicle sensors 140 may include, for example, one or more global positioning system (GPS) receivers, inertial measurement units (IMUs), accelerometers, gyroscopes, magnometers, pressure sensors (altimeters, static tubes, pitot tubes, etc.), temperature sensors, vane sensors, range sensors (e.g., laser altimeters, radar altimeters, lidars, radars, ultrasonic range sensors, etc.), terrain elevation data, geographic data, airport or landing zone data, rotor revolutions per minute (RPM) sensors, manifold pressure sensors, or other suitable sensors. In some cases the vehicle sensors 140 may include, for example, redundant sensor channels for some or all of the vehicle sensors 140. The vehicle control and interface system 100 may use data captured by the vehicle sensors 140 for various processes. By way of example, the universal vehicle control router 120 may use vehicle sensor data captured by the vehicle sensors 140 to determine an estimated state of the vehicle, as described in greater detail below with reference to FIG. 3.

The data store 150 is a database storing various data for the vehicle control and interface system 100. For instance, the data store 150 may store sensor data (e.g., captured by the vehicle sensors 140), vehicle models, vehicle metadata, or any other suitable data.

Figure 2:
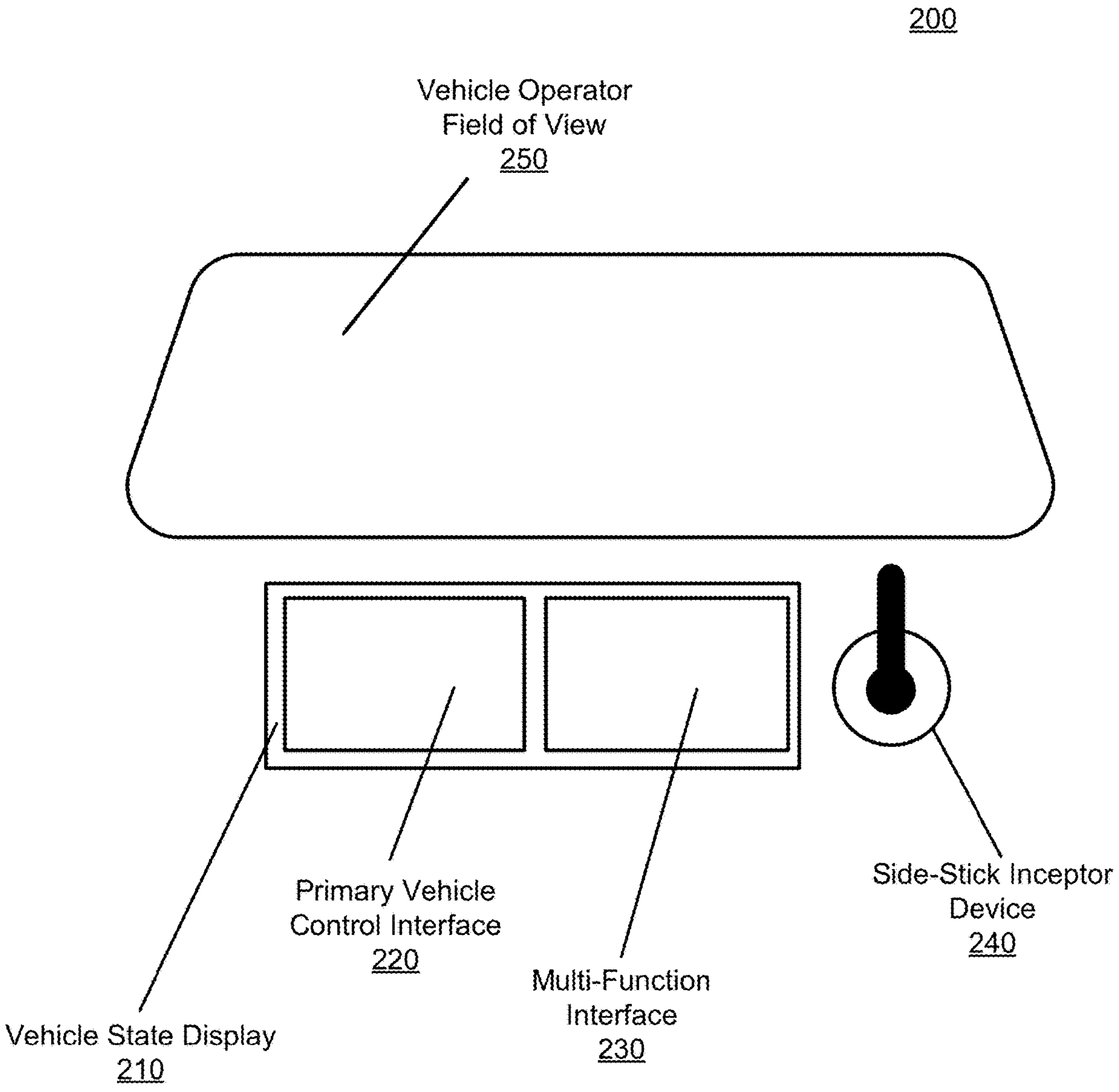
FIG. 2 illustrates one example embodiment of a configuration for a set of universal vehicle control interfaces in a vehicle.

FIG. 2 illustrates one example embodiment of a configuration 200 for a set of universal vehicle control interfaces in a vehicle. The vehicle control interfaces in the configuration 200 may be embodiments of the universal vehicle control interfaces 110, as described above with reference to FIG. 1. In the embodiment shown, the configuration 200 includes, a vehicle state display 210, a side-stick inceptor device 240, and a vehicle operator field of view 250. In other embodiments, the configuration 200 may include different or additional elements. Furthermore, the functionality may be distributed among the elements in a different manner than described.

The vehicle state display 210 is one or more electronic displays (e.g., liquid-crystal displays (LCDs) configured to display or receive information describing a state of the vehicle including the configuration 200. In particular, the vehicle state display 210 may display various interfaces including feedback information for an operator of the vehicle. In this case, the vehicle state display 210 may provide feedback information to the operator in the form of virtual maps, 3D terrain visualizations (e.g., wireframe, rendering, environment skin, etc.), traffic, weather, engine status, communication data (e.g., air traffic control (ATC) communication), guidance information (e.g., guidance parameters, trajectory), and any other pertinent information. Additionally, or alternatively, the vehicle state display 210 may display various interfaces for configuring or executing automated vehicle control processes, such as automated aircraft landing or takeoff or navigation to a target location. The vehicle state display 210 may receive user inputs via various mechanisms, such as gesture inputs (as described above with reference to the gesture interface 220), audio inputs, or any other suitable input mechanism. Embodiments of the vehicle state display 230 are described in greater detail below with reference to FIGS. 3 and 6A-C.

As depicted in FIG. 2 the vehicle state display 210 includes a primary vehicle control interface 220 and a multi-function interface 230. The primary vehicle control interface 220 is configured to facilitate short-term of the vehicle including the configuration 200. In particular, the primary vehicle control interface 220 includes information immediately relevant to control of the vehicle, such as current universal control input values or a current state of the vehicle. As an example, the primary vehicle control interface 220 may include a virtual object representing the vehicle in 3D or 2D space. In this case, the primary vehicle control interface 220 may adjust the display of the virtual object responsive to operations performed by the vehicle in order to provide an operator of the vehicle with visual feedback. The primary vehicle control interface 220 may additionally, or alternatively, receive universal vehicle control inputs via gesture inputs. Example embodiments of the primary vehicle control interface 220 are described in greater detail below with reference to FIGS. 6A-C.

The multi-function interface 230 is configured to facilitate long-term control of the vehicle including the configuration 200. In particular, the primary vehicle control interface 220 may include information describing a mission for the vehicle (e.g., navigation to a target destination) or information describing the vehicle systems. Information describing the mission may include routing information, mapping information, or other suitable information. Information describing the vehicle systems may include engine health status, engine power utilization, fuel, lights, vehicle environment, or other suitable information. In some embodiments, the multi-function interface 230 or other interfaces enable mission planning for operation of a vehicle. For example, the multi-function interface 230 may enable configuring missions for navigating a vehicle from a start location to a target location. In some cases, the multi-function interface 230 or another interface provides access to a marketplace of applications and services. The multi-function interface 230 may also include a map, a radio tuner, or a variety of other controls and system functions for the vehicle. An example embodiment of the multi-function interface 230 is described in greater detail below with reference to FIGS. 6A-D.

In some embodiments, the vehicle state display 210 includes information describing a current state of the vehicle relative to one or more control limits of the vehicle (e.g., on the primary vehicle control interface 220 or the multi-function interface 230). For example, the information may describe power limits of the vehicle or include information indicating how much control authority a use has across each axis of movement for the vehicle (e.g., available speed, turning ability, climb or descent ability for an aircraft, etc.). In the same or different example embodiment, the vehicle state display 210 may display different information depending on a level of experience of a human operator of the vehicle. For instance, if the vehicle is an aircraft and the human operator is new to flying, the vehicle state display may include information indicating a difficulty rating for available flight paths (e.g., beginner, intermediate, or expert). The particular experience level determined for an operator may be based upon prior data collected and analyzed about the human operator corresponding to their prior experiences in flying with flight paths having similar expected parameters. Additionally, or alternatively, flight path difficulty ratings for available flight paths provided to the human operator may be determined based on various information, for example, expected traffic, terrain fluctuations, airspace traffic and traffic type, how many airspaces and air traffic controllers along the way, or various other factors or variables that are projected for a particular flight path. Moreover, the data collected from execution of this flight path can be fed back into the database and applied to a machine learning model to generate additional and/or refined ratings data for the operator for subsequent application to other flight paths. Vehicle operations may further be filtered according to which one is the fastest, the most fuel efficient, or the most scenic, etc.

The one or more vehicle state displays 210 may include one or more electronic displays (e.g., liquid-crystal displays (LCDs), organic light emitting diodes (OLED), plasma). For example, the vehicle state display 210 may include a first electronic display for the primary vehicle control interface 220 and a second electronic display for the multi-function interface 230. In cases where the vehicle state display 210 include multiple electronic displays, the vehicle state display 210 may be configured to adjust interfaces displayed using the multiple electronic displays, e.g., in response to failure of one of the electronic displays. For example, if an electronic display rendering the primary vehicle control interface 240 fails, the vehicle state display 210 may display some or all of the primary vehicle control interface 240 on another electronic display.

The one or more electronic displays of the vehicle state display 210 may be touch sensitive displays is configured to receive touch inputs from an operator of the vehicle including the configuration 200, such as a multi-touch display. For instance, the primary vehicle control interface 220 may be a gesture interface configured to receive universal vehicle control inputs for controlling the vehicle including the configuration 200 via touch gesture inputs. In some cases, the one or more electronic displays may receive inputs via other type of gestures, such as gestures received via an optical mouse, roller wheel, three-dimensional (3D) mouse, motion tracking device (e.g., optical tracking), or any other suitable device for receiving gesture inputs. Embodiments of a gesture interface are described in greater detail below with reference to FIGS. 3, 4, and 5.

Touch gesture inputs received by one or more electronic displays of the vehicle state display 210 may include single finger gestures (e.g., executing a predetermined pattern, swipe, slide, etc.), multi-finger gestures (e.g., 2, 3, 4, 5 fingers, but also palm, multi-hand, including/excluding thumb, etc.; same or different motion as single finger gestures), pattern gestures (e.g., circle, twist, convergence, divergence, multi-finger bifurcating swipe, etc.), or any other suitable gesture inputs. Gesture inputs can be limited asynchronous inputs (e.g., single input at a time) or can allow for multiple concurrent or synchronous inputs. In variants, gesture input axes can be fully decoupled or independent. In a specific example, requesting a speed change holds other universal vehicle control input parameters fixed—where vehicle control can be automatically adjusted in order to implement the speed change while holding heading and vertical rate fixed. Alternatively, gesture axes can include one or more mutual dependencies with other control axes. Unlike conventional vehicle control systems, such as aircraft control systems, the gesture input configuration as disclosed provides for more intuitive user experiences with respect to an interface to control vehicle movement.

In some embodiments, the vehicle state display 220 or other interfaces are configured to adjust in response to vehicle operation events, such as emergency conditions. For instance, in response to determining the vehicle is in an emergency condition, the vehicle control and interface system 100 may adjust the vehicle state display 210 to include essential information or remove irrelevant information. As an example, if the vehicle is an aircraft and the vehicle control and interface system 100 detects an engine failure for the aircraft, the vehicle control and interface system 100 may display essential information on the vehicle state display 210 including 1) a direction of the wind, 2) an available glide range for the aircraft (e.g., a distance that the aircraft can glide given current conditions), or 3) available emergency landing spots within the glide range. The vehicle control and interface system 100 may identify emergency landing locations using various processes, such as by accessing a database of landing spots (e.g., included in the data store 150 or a remote database) or ranking landing spots according to their suitability for an emergency landing.

The side-stick inceptor device 240 may be a side-stick inceptor configured to receive universal vehicle control inputs. In particular, the side-stick inceptor device 240 may be configured to receive the same or similar universal vehicle control inputs as a gesture interface of the vehicle state display 210 is configured to receive. In this case, the gesture interface and the side-stick inceptor device 240 may provide redundant or semi-redundant interfaces to a human operator for providing universal vehicle control inputs. The side-stick inceptor device 240 may be active or passive. Additionally, the side-stick inceptor device 240 and may include force feedback mechanisms along any suitable axis. For instance, the side-stick inceptor device 240 may be a 3-axis inceptor, 4-axis inceptor (e.g., with a thumb wheel), or any other suitable inceptor. Processing inputs received via the side-stick inceptor device 240 is described in greater detail below with reference to FIGS. 3 and 5.

The components of the configuration 200 may be integrated with the vehicle including the configuration 200 using various mechanical or electrical components. These components may enable adjustment of one or more interfaces of the configuration 200 for operation by a human operator of the vehicle. For example, these components may enable rotation or translation of the vehicle state display 230 toward or away from a position of the human operator (e.g., a seat where the human operator sits). Such adjustment may be intended, for example, to prevent the interfaces of the configuration 200 from obscuring a line of sight of the human operator to the vehicle operator field of view 250.

The vehicle operator field of view 250 is a first-person field of view of the human operator of the vehicle including the configuration 200. For example, the vehicle operator field of view 250 may be a windshield of the vehicle or other suitable device for enabling a first-person view for a human operator.

The configuration 200 additionally or alternately include other auxiliary feedback mechanisms, which can be auditory (e.g., alarms, buzzers, etc.), haptic (e.g., shakers, haptic alert mechanisms, etc.), visual (e.g., lights, display cues, etc.), or any other suitable feedback components. Furthermore, displays of the configuration 200 (e.g., the vehicle state display 210) can simultaneously or asynchronously function as one or more of different types of interfaces, such as an interface for receiving vehicle control inputs, an interface for displaying navigation information, an interface for providing alerts or notifications to an operator of the vehicle, or any other suitable vehicle instrumentation. Furthermore, portions of the information can be shared between multiple displays or configurable between multiple displays.

First Example Vehicle Control Routers

Figure 3:
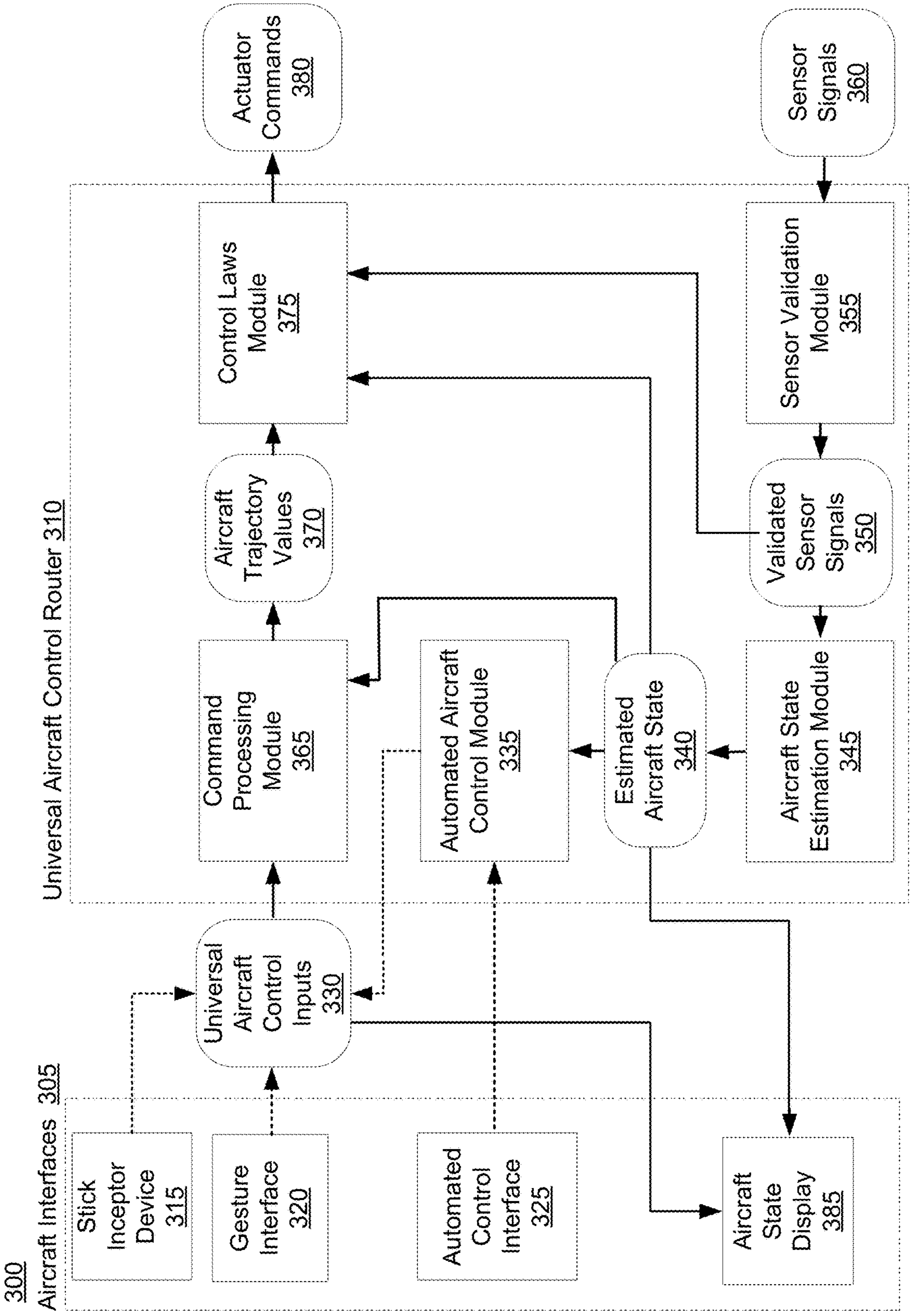
FIG. 3 illustrates one example embodiment of a process flow for a universal aircraft control router to convert a set of universal aircraft control inputs to corresponding actuator commands for a particular aircraft.

FIG. 3 illustrates one embodiment of a process flow 300 for a universal aircraft control router 310 to convert a set of universal aircraft control inputs 330 to corresponding actuator commands 380 for a particular aircraft. The universal aircraft control router 310 may be an embodiment of the universal vehicle control router 120. Although the embodiment depicted in FIG. 3 is particularly directed to operating an aircraft (e.g., a rotorcraft or fixed-wing aircraft), one skilled in the art will appreciate that similar processes can be applied to other vehicles, such as motor vehicles or watercraft. As illustrated in FIG. 3, rectangles with sharp corners represent modules or components while rectangles with rounded corners represent signals transmitted between the modules/components.

In the embodiment shown in FIG. 3, the set of universal aircraft control inputs 330 originate from one or more of aircraft interfaces 305. The aircraft interfaces 305 may be embodiments of the universal vehicle control interfaces 110. In the example of FIG. 3, the aircraft interfaces 305 include a stick inceptor device 315 (e.g., the side-stick inceptor device 240), a gesture interface (e.g., a gesture interface of the vehicle state display 210), and an automated control interface 325 (e.g., an automated vehicle control interface of the vehicle state display 210). As indicated by the dashed lines, at a given time the universal aircraft control inputs 330 may include inputs received from some or all of the aircraft interfaces 305.

Inputs received from the stick inceptor device 315 or the gesture interface 320 are routed to the command processing module 365 as universal aircraft control inputs 330. Conversely, inputs received from the automated control interface 325 are routed to an automated aircraft control module 335 of the universal aircraft control router 310. Inputs received by the automated aircraft control module 335 may include information for selecting or configuring automated control processes. The automated control processes may include automated aircraft control macros (e.g., operation routines), such as automatically adjusting the aircraft to a requested aircraft state (e.g., a requested forward velocity, a requested lateral velocity, a requested altitude, a requested heading, a requested landing, a requested takeoff, etc.). Additionally, or alternatively, the automated control processes may include automated mission or navigation control, such as navigating an aircraft from an input starting location to an input target location in the air or ground. In these or other cases, the automated aircraft control module 335 generates a set of universal aircraft control inputs suitable for executing the requested automated control processes. The automated aircraft control module 335 may use the estimated aircraft state 340 to generate the set of universal aircraft control inputs, as described below with reference to the aircraft state estimation module 345. Additionally, or alternatively, the automated aircraft control module 335 may generate the set of universal aircraft control inputs over a period of time, for example during execution of a mission to navigate to a target location. The automated aircraft control module 335 further provides generated universal aircraft control inputs for inclusion in the set of universal aircraft control inputs 330.

The aircraft state estimation module 345 determines the estimated aircraft state 340 of the aircraft including the universal aircraft control router 310 using the validated sensor signals 350. The estimated aircraft state 340 may include various information describing a current state of the aircraft, such as an estimated 3D position of the vehicle with respect to the center of the Earth, estimated 3D velocities of the aircraft with respect to the ground or with respect to a moving air mass, an estimated 3D orientation of the aircraft, estimated 3D angular rates of change of the aircraft, an estimated altitude of the aircraft, or any other suitable information describing a current state of the aircraft. The aircraft state estimation module 345 determines the estimated state of the aircraft 340 by combining validated sensor signals 350 captured by different types of sensors of the aircraft, such as the vehicle sensors 140 described above with reference to FIG. 1. In some cases, sensor signals may be captured by different types of sensors of the aircraft at different frequencies or may not be available at a particular time. In such cases, the aircraft state estimation module 345 may adjust the process used to determine the estimated aircraft state 340 depending on which sensor signals are available in the validated sensor signals 350 at a particular time. For example, the aircraft state estimation module 345 may use a global positioning system (GPS) signal to estimate an altitude of the aircraft whenever it is available, and may instead use a pressure signal received from a pressure altimeter to estimate a barometric altitude of the aircraft if the GPS signal is unavailable. As another example, if validated sensor signals 350 are not available for a particular sensor channel the aircraft state estimation module 345 may estimate validated sensor signals for the particular sensor channel. In particular, the aircraft state estimation module 345 may estimate validated sensor signals using a model including parameters for the aircraft. In some cases the parameters of a model for the aircraft may be dynamic, e.g., adjusting with respect to a state of the aircraft. Such dynamic adjustment of model parameters may facilitate more accurate estimation of a future state of the aircraft in the near future or for reduced-lag filtering of the sensor signals.

In some embodiments, the aircraft state estimation module 345 precisely estimates an altitude of the aircraft above a surface of the Earth (e.g., an "altitude above the ground") by combining multiple altitude sensor signals included in the validated sensor signals 350. Altitude sensor signals may include GPS signals, pressure sensor signals, range sensor signals, terrain elevation data, or other suitable information. The aircraft state estimation module 345 may estimate an altitude of the aircraft above an ellipsoid representing the Earth using a GPS signal if the GPS signal is available in the validated sensor signals 350. In this case, the aircraft state estimation module 345 may estimate the altitude above the ground by combining the altitude above the ellipsoid with one or more range sensor signals (e.g., as described above with reference to the vehicle sensors 140) or terrain elevation data. Additionally, or alternatively, the aircraft state estimation module 345 may determine an offset between the altitude above the ellipsoid and a barometric altitude determined, e.g., using sensor signals captured by a pressure altimeter. In this case, aircraft state estimation module 345 may apply the offset to a currently estimated barometric altitude if a GPS signal is unavailable in order to determine a substitute altitude estimate for the altitude above the ellipsoid. In this way, the aircraft state estimation module 345 may still provide precise altitude estimates during GPS signal dropouts the and a barometric altitude using a pressure value received from a pressure altimeter.

Among other advantages, by precisely estimating the altitude above the ground through combining multiple altitude sensor signals, the aircraft state estimation module 345 can provide altitude estimates usable for determining if the aircraft has landed, taken off, or is hovering. Additionally, the aircraft state estimation module 345 can provide altitude estimates indicating precise characteristics of the ground below the aircraft, e.g., if the ground is tilted or level in order to assess if a landing is safe. This is in contrast to conventional systems, which require specialized equipment for determining specific aircraft events requiring precise altitude determinations (e.g., takeoffs or landing) due to imprecise altitude estimates. As an example, the universal aircraft control router 310 can use the precise altitude estimates to perform automatic landing operations at locations that are not equipped with instrument landing systems for poor or zero-visibility conditions (e.g., category II or III instrument landing systems). As another example, universal aircraft control router 310 can use the precise altitude estimates to automatically maintain a constant altitude above ground for a rotorcraft (e.g., during hover-taxi) despite changing ground elevation below the rotorcraft. As still another example, the universal aircraft control router 310 can use the precise altitude estimates to automatically take evasive action to avoid collisions (e.g., ground collisions).

In some embodiments, the aircraft state estimation module 345 estimates a ground plane below the aircraft. In particular, the aircraft state estimation module 345 may estimate the ground plane combing validated sensor signals from multiple range sensors. Additionally, or alternatively, the aircraft state estimation module 345 may estimate of a wind vector by combining a ground velocity, airspeed, or sideslip angle measurements for the aircraft.

The sensor validation module 355 validates sensor signals 360 captured by sensors of the aircraft including the universal aircraft control router 310. For example, the sensor signals 360 may be captured by embodiments of the vehicle sensors 140 described above with reference to FIG. 1. The sensor validation module 355 may use various techniques to validate the sensor signals 360. In particular, the sensor validation module 355 may set flags for each aircraft sensor indicating a state of the sensor that are updated on a periodic or continual basis (e.g., every time step). For instance, the flags may indicate a quality of communication from a sensor (e.g., hardware heartbeat or handshake, a transportation checksum, etc.) whether captured sensor signals are sensical or non-sensical (e.g., within realistic value ranges), or whether captured sensor values are valid or invalid in view of a current state of the aircraft (e.g., as determined using the estimated aircraft state 340). In such cases the sensor validation module 355 may not validate sensor signals form the sensor signals 360 that correspond to aircraft sensors having certain flags set (e.g., nonsensical or invalid sensor signals). Additionally, or alternatively, the sensor validation module 355 may receive sensor signals from different aircraft sensors asynchronously. For example, different aircraft sensors may capture sensor signals at different rates or may experience transient dropouts or spurious signal capture. In order to account for asynchronous reception of sensor signals, the sensor validation module 355 may apply one or more filters to the sensor signals 360 that synchronize the sensor signals for inclusion in the validated sensor signals 350.

In some embodiments, the aircraft sensors include multiple sensors of the same type capturing sensor signals of the same type, referred to herein as redundant sensor channels and redundant sensor signals, respectively. In such cases the sensor validation module may compare redundant sensor signals in order to determine a cross-channel coordinated sensor value. For instance, the sensor validation module 355 may perform a statistical analysis or voting process on redundant sensor signals (e.g., averaging the redundant sensor signals) to determine the cross-channel coordinated sensor value. The sensor validation module 355 may include cross-channel coordinated sensor values in the validated sensor signals 350.

The command processing module 365 generates the aircraft trajectory values 370 using the universal aircraft control inputs 330. The aircraft trajectory values 370 describe universal rates of change of the aircraft along movement axes of the aircraft in one or more dimensions. For instance, the aircraft trajectory values 370 may include 3D linear velocities for each axis of the aircraft (e.g., x-axis or forward velocity, y-axis or lateral velocity, and z-axis or vertical velocity) and an angular velocity around a pivot axis of the vehicle (e.g., degrees per second), such as a yaw around a yaw axis.

In some embodiments the command processing module 365 performs one or more smoothing operations to determine a set of smoothed aircraft trajectory values that gradually achieve a requested aircraft trajectory described by the universal aircraft control inputs 330. For instance, the universal aircraft control inputs 330 may include a forward speed input that requests a significant increase in speed from a current speed (e.g., from 10 knots per second (KTS) to 60 KTS). In this case, the command processing module 365 may perform a smoothing operation to convert the forward speed input to a set of smoothed velocity values corresponding to a gradual increase in forward speed from a current aircraft forward speed to the requested forward speed. The command processing module 365 may include the set of smoothed aircraft trajectory values in the aircraft trajectory values. In some cases, the command processing module 365 may apply different smoothing operations to universal aircraft control inputs originating from different interfaces of the aircraft interfaces 305. For instance, the command processing module 365 may apply more gradual smoothing operations to universal aircraft control inputs received from the gesture interface 320 and less gradual smoothing operations to the stick inceptor device 315. Additionally, or alternatively, the command processing module 365 may apply smoothing operations or other operations to universal aircraft control inputs received from the stick inceptor device 315 in order to generate corresponding aircraft trajectory values that simulate manual operation of the aircraft.

In some embodiments, the command processing module 365 processes individual aircraft control inputs in the universal aircraft control inputs 330 according to an authority level of the individual aircraft control inputs. In particular, the authority levels indicate a processing priority of the individual aircraft control inputs. An authority level of an aircraft control input may correspond to an interface of the aircraft interfaces 305 that the aircraft control input originated from, may correspond to a type of operation the aircraft control input describes, or some combination thereof. In one embodiment, aircraft control inputs received from the stick inceptor device 315 have an authority level with first priority, aircraft control inputs received from the gesture interface 320 have an authority level with second priority, aircraft control inputs received from the automated aircraft control module 335 for executing automated aircraft control macros have an authority level with a third priority, and aircraft control inputs received from the automated aircraft control module 335 for executing automated control missions have an authority level with a fourth priority. Other embodiments may have different authority levels for different aircraft control inputs or may include more, fewer, or different authority levels. As an example, an operator of the aircraft may provide an aircraft control input via the stick inceptor device 315 during execution of an automated mission by the automated aircraft control module 335. In this case, the command processing module 365 interrupts processing of aircraft control inputs corresponding to automated mission in order to process the aircraft control input received from the stick inceptor device 315. In this way, the command processing module 365 may ensure that the operator of the aircraft can take control of the aircraft at any time via a suitable interface.

The control laws module 375 generates the actuator commands (or signals) 380 using the aircraft trajectory values 370. The control laws module 375 includes an outer processing control loop and an inner processing control loop cascaded after the outer processing control loop. The outer processing control loop applies a set of control laws to the received aircraft trajectory values 370 to convert the aircraft trajectory values 370 to corresponding allowable aircraft trajectory values. The inner processing control loop converts the allowable aircraft trajectory values to the actuator commands 380 configured to operate the aircraft to adjust a current trajectory of the aircraft to an allowable trajectory defined by the allowable aircraft trajectory values (from the outer processing control loop). In some embodiments, one or both the outer processing loop and the inner processing loop are configured to operate independently of the particular aircraft including the universal aircraft control router 310. In order to operate independently in this manner, the inner and outer processing loops may use a model including parameters describing characteristics of the aircraft that can be used as input to processes or steps of the outer and inner processing loops. In some embodiments, the model used by the control laws module 375 is a different than the model used by the aircraft state estimation module 345, as described above. For instance, the models used by the control laws module 375 and the aircraft state estimation module 345 may respectively include parameters relevant to determining the actuator commands 380 and relevant to determining the estimated aircraft state 340. The control laws module 375 may use the actuator commands 380 to directly control corresponding actuators, or may provide the actuator commands 380 to one or more other components of the aircraft to be used to operate the corresponding actuators.

The outer processing loop may apply the control laws in order impose various protections or limits on operation of the aircraft, such as aircraft envelope protections, movement range limits, structural protections, aerodynamic protections, impose regulations (e.g., noise, restricted airspace, etc.), or other suitable protections or limits. Moreover, the control laws may be dynamic, such as varying depending on an operational state of the aircraft, or static, such as predetermined for a particular type of aircraft or type of aircraft control input. As an example, if the aircraft is a rotorcraft the set of control laws applied by the outer processing loop may include maximum and minimum rotor RPMs, engine power limits, aerodynamic limits such as ring vortex, loss of tail-rotor authority, hover lift forces at altitude, boom strike, maximum bank angle, or side-slip limits. As another example, if the aircraft is a fixed-wing aircraft the set of control laws applied by the outer processing loop may include stall speed protection, bank angle limits, side-slip limits, g-loads, flaps or landing gear max extension speeds, or velocity never exceeds (VNEs). Additionally, or alternatively, the outer processing loop uses the estimated aircraft state 340 to convert the aircraft trajectory values 370 to corresponding allowable aircraft trajectory values. For instance, the outer processing loop may compare a requested aircraft state described by the aircraft trajectory values 370 to the estimated aircraft state 340 in order to determine allowable aircraft trajectory values, e.g., to ensure stabilization of the aircraft.

In some embodiments, the inner processing loop converts the allowable aircraft trajectory values in an initial frame of reference to a set of body trajectory values relative to a body frame of reference for the aircraft. In particular, the set of body trajectory values precisely define movement of the aircraft intended by the allowable aircraft trajectory values. The initial frame of reference may be various suitable frames of reference, such as an inertial frame of reference, a frame of reference including rotations around one or more axes of the inertial frame, or some combination thereof. For instance, if the allowable aircraft trajectory values include a velocity for an x-axis, y-axis, z-axis and a heading rate change, the initial frame of reference may be an inertial frame with a rotation (e.g., yaw) around the z-axis. The body frame includes eight coordinates collectively representing 3D velocities and yaw, pitch, and roll angles of the aircraft.

In the same or different embodiments, the inner processing loop determines a difference between the estimated aircraft state 340 and an intended aircraft state corresponding to the allowable aircraft trajectory values, the difference referred to herein as a "command delta." For example, the inner processing loop may determine the intended aircraft state using the body trajectory values of the aircraft, as described above. The inner processing loop uses the command delta to determine actuator commands 380 configured to operate actuators of the aircraft to adjust the state of the aircraft to the intended aircraft state. In some cases, the inner processing loop applies a gain schedule to the command delta to determine the actuator commands 380. For example, the inner processing loop may operate as a linear-quadratic regulator (LQR). Applying the gain schedule may include applying one or more gain functions to the command delta. The control laws module 375 may determine the gain schedule based on various factors, such as a trim airspeed value corresponding to the linearization of nonlinear aircraft dynamics for the aircraft. In the same or different embodiments, the inner processing loop uses a multiple input and multiple output (MIMO) protocol to determine or transmit the actuator commands 380.

In some embodiments where the aircraft is a rotorcraft, the outer processing loop is configured to facilitate execution of an automatic autorotation process for the rotorcraft. In particular, the automatic autorotation process facilitates autorotation by the rotorcraft during entry, glide, flare, and touch down phases. Additionally, or alternatively, the outer processing loop may be configured to facilitate autorotation by the aircraft in response to one or more emergency conditions (e.g., determined based on the estimated aircraft state 340). Execution of the automatic autorotation process by the outer processing loop offloads operation autorotation rotorcraft maneuvers from a human operator of the rotorcraft, thus simplifying user operation and improving the safety. Furthermore, in some embodiments where the aircraft is a fixed-wing aircraft, the outer processing loop may facilitate an automatic landing procedure. In particular, the outer processing loop may facilitate the automatic landing procedure even during emergency conditions, e.g., if an engine of the aircraft has failed. The aircraft state display 385 includes one or more interfaces displaying information describing the estimated aircraft state 340 received from the universal aircraft control router 310. For instance, the aircraft state display may be an embodiment of the aircraft state display 210 described above with reference to FIG. 2. The aircraft state display 385 may display information describing the estimated aircraft state 340 for various reasons, such as to provide feedback to an operator of the aircraft responsive to the universal aircraft control inputs 330 or to facilitate navigation of the aircraft. Example aircraft state interfaces that may be displayed by the aircraft state display 385 are described in greater detail below with reference to FIGS. 6A-D.

Adapting to Degraded Flight States

The universal aircraft control router 310 may adapt to different aircraft states. For example, if a sensor or actuator malfunction, the universal aircraft control router 310 may determine the aircraft is in a degraded flight state and may modify the operation of one or more modules accommodate the degraded flight state. Among other advantages, the modifications by the universal aircraft control router 310 may result in a seamless operational transition from a normal state to a degraded state. For example, the universal aircraft control router 310 may modify operation of the aircraft without requiring the user (e.g., pilot) to change how they interact with one or more of the aircraft interfaces 305. In some cases, the transition may be so seamless that the user (e.g., pilot) may be unable to detect the operational transition (e.g., the transition seems continuous to the user (e.g., pilot)). Yet, the universal aircraft control router 310 may notify the user (e.g., pilot) of the state change (e.g., a notification on the aircraft state display 385) so the user can maintain situational awareness.

As used herein, a flight state of the aircraft is different from a flight mode. Flight modes refer to different ways for a user to control an aircraft, such as visual flight rules (VFR) or impaired flight rules (IFR). Said differently, different flight modes require the user to interact with the aircraft in different ways (for example, a user may receive different training for each mode). In contrast, a user may interact with the aircraft in the same or similar way across different flight states. Said differently, a user may control the aircraft in the same or similar ways for different flight states (e.g., for a normal and degraded flight states). Example flight states include autorotation states and even specific autorotation sub-states, such as entry to glide, glide, flare, and letdown. Other example flight states include: hover-taxi, up and away flight, pickup or setdown, pickup or setdown, and auto pickup or setdown.

A normal flight state (or "non-degraded" flight state) refers to an aircraft with components operating as intended and as expected. During a normal flight state, the components may be functioning normally within operational bounds. In contrast, a degraded flight state refers to an aircraft with at least one compromised component (e.g., the component is malfunctioning or is unreliable). The compromised component may necessitate altering operation of the aircraft or may alter the capabilities of the aircraft. For example, an aircraft may be in a degraded flight state if it contains a malfunctioning actuator or sensor (e.g., that affects the capabilities of the aircraft). In another example, an aircraft is in a degraded flight state if an airframe component of the aircraft is damaged. There may be different types of degraded states, such as degraded hover-taxi and degraded up and away flight.

As previously described, the aircraft state estimation module 345 may determine the estimated aircraft state 340 using the validated sensor signals 350. The estimated state 340 may indicate whether the aircraft is in a normal or degraded flight state. If the aircraft is in a degraded state, the estimated state 340 may indicated the type of degraded state and the compromised component that triggered the degraded state. After the estimated aircraft state 340 is determined, the state 340 may be transmitted to the command processing module 365 and the control laws module 375.

In some embodiments, responsive to the aircraft state estimation module 345 determining the aircraft is in a degraded state a notification may be sent to the user (e.g., a notification is displayed on the aircraft state display 385) to help the user maintain situational awareness and to understand the state of the aircraft. The notification may indicate that the aircraft is in a degraded state, may indicate which component is compromised, may indicate any actions the user should take in response to the degraded state, or some combination thereof.

Responsive to the aircraft state estimation module 345 determining the aircraft is in a degraded state, one or more modules of the universal aircraft control router 310 may be modified (e.g., by 310 or the modules themselves). More specifically, components or processes of those modules may be modified. For example, responsive to receiving an indication of the degraded state (e.g., by receiving an estimated state 340), the command processing module 365 or the control laws module 375 are modified according to the degraded state. As used herein, "modifying" a module due to a degraded state or compromised component may refer to modifying a component of that module or a process performed by that module. Modifying a process of a module, such as a processing control loop, may refer to changing the how the process is performed or turning off the process entirely.

Generally, if the compromised component enabled a feature or capability of the aircraft, then one or more modules may be modified so that the feature or capability is no longer available (e.g., the capabilities are disabled). The universal aircraft control router 310 may turn on/off different controllers, integrators, protection logic, etc. within the modules to remove that feature or capability.

The specific modifications may depend on the degraded state or the compromised component. For example, if a sensor becomes compromised (resulting in a degraded state), processes or modules that use data from that sensor (e.g., portions of any of the processing loops) may be modified. For example, if the above ground radar is compromised, then bottom out protection may be disabled if there is no way to detect where the ground is when flying above it. If data from a compromised sensor was used by a process to determine a certain result (e.g., the altitude of the aircraft), modifying a process may include using data from a different sensor to determine a same or similar result (examples include: (1) when losing magnetic heading, heading can be estimated using the heading as measured by direction of travel over the ground and (2) an altitude estimate can be provided from a combination of GPS, radar, and pressure making it so that if any one system is lost, the signal stays robust). Similarly, if an actuator becomes compromised, processes or modules that may result in generating actuator commends for that actuator may be modified so that the compromised actuator is not used. Additionally, or alternatively, depending on the compromised component, one or more aircraft interfaces 305 (or portions of those interfaces) may be disabled (e.g., due to lack of state information or a capability of the aircraft).

In some cases, a portion of the inner processing loop or the outer processing loop of the control laws module 375 is modified responsive to a degraded state. For example, if a sensor is compromised, the control laws module 375 modifies an integrator in the inner processing loop (e.g., turns it off or on) to help with tracking performance.

In another example, data from a magnetometer sensor may be used to determine (e.g., precise) heading tracking of the aircraft using a heading processing loop of the control laws module 375 (e.g., part of the outer or inner processing loop). If the magnetometer becomes compromised, the heading tracking will become inaccurate. In response to a compromised magnetometer, the control laws module 375 may turn off the heading processing loop (e.g., turn off the heading processing loop in the outer or inner processing loop). The control laws module 375 may then perform heading tracking using a different calculation or data from a different sensor. For example, one of the processing loops of the control laws module 375 is modified so that heading is dead-reckoned (in other words, predicted) or estimated using ground track heading. Additionally if the heading estimate is completely lost (e.g., the error is outside of an error threshold), and as a result the ability to 'close-the-loop' on heading, gains may be tuned to create a similar control response to when heading estimate was available.

In another example, data from a GPS sensor may be used by the outer processing loop to tracking movement of the aircraft from a first waypoint to a second waypoint. If the GPS becomes compromised, the movement tracking will become inaccurate. In response to a compromised GPS sensor, the control laws module 375 may turn off the portion of the outer processing loop used to track movement of the aircraft from the first waypoint to the second waypoint. In another example, a portion of the outer processing loop uses data from a GPS sensor to track the altitude of the aircraft. In response to a compromised GPS sensor, the control laws module 375 may modify the outer processing loop to determine the aircraft altitude using data from an air data sensor instead of the GPS sensor.

As previously described, the outer processing loop of the control laws module 375 may apply a set of control laws to the received aircraft trajectory values 370 to convert the aircraft trajectory values 370 to corresponding allowable aircraft trajectory values. However, if a component is compromised, the outer processing loop may be modified to apply a different set of control laws to received aircraft trajectory values 370. This may help the control laws module 375 output meaningful aircraft trajectory values 370 despite the compromised component (e.g., despite the limited sensor data, assuming a sensor becomes compromised). The set of control laws may be selected from sets of control laws according to the degraded flight state of the aircraft. For example, there may be a different set of control laws for each possible degraded flight state, where each set is configured to accommodate the specific degraded state (e.g., accommodate the corresponding compromised component).

In some embodiments, controllers that provide higher precision control in a specific axis are modified (e.g., turned off). For example, when the vehicle is close to the ground, it can determine a higher precision estimate of altitude using radar. If the radar sensor is compromised, then alternative altitude estimates are less precise and may provide less precise control in altitude due to that estimate drifting.

In some cases, a data filter may be modified to enable the control laws module 375 to use degraded sensor input. This relates to sensing degradation of a sensor and adaptively changing filtering or blending of that sensor data based on how degraded the sensor is. This allows the control laws module 375 to use the sensor data in various capacities regardless of its performance (however, in some cases control laws module 375 may be completely ignore data from that sensor).

In some cases, the configuration of the command processing module 365 is modified responsive to an indication the aircraft is in a degraded state. For example, the aircraft trajectory values 370 may be generated differently (e.g., based on the limited sensor data) when the aircraft is in a degraded state. This may result in the command processing module 365 applying different smoothing operations while in the degraded state to determine the aircraft trajectory values 370 (e.g., a different set of smoothing operations for each type of degraded state). In some cases, the command processing module 365 may be configured to ignore inputs from one or more aircraft interfaces 305. For example, if the GPS sensor is compromised, the command processing module 365 may ignore some (or all) inputs from the automated aircraft control module 335.

Thus, the universal aircraft control router 310 can adapt to the different aircraft states (by modifying one or more modules) and enables the user to continue interacting with the aircraft in the same way or similarly across the different states. For example, the aircraft responds similarly to the same interactions across different states (e.g., in both the normal and degraded states, the user can pull up on a stick inceptor to direct the aircraft upward). Said differently, inputs from the aircraft interfaces 305 may have a similar response for the same given input across different aircraft states. Among other advantages, this reduces the user workload during flight compared to conventional systems, which require the user to know how to respond to each type of component failure and operate the aircraft differently for different types of failures. In contrast, the current embodiments may implement changes so that the user may be unable to detect the change.

Figure 8:
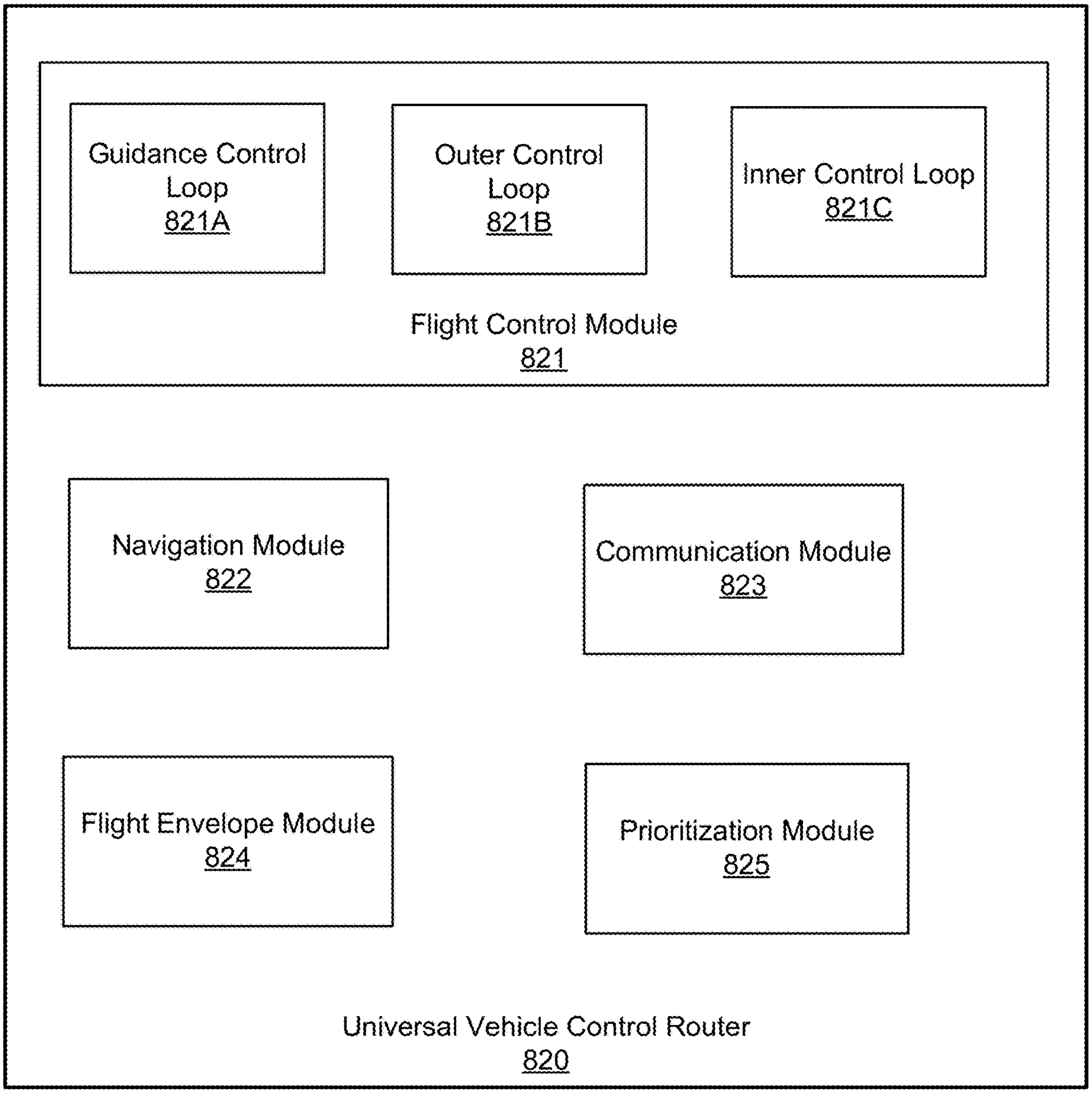
FIG. 8 is a flow diagram illustrating one example embodiment of a process for generating actuator commands for aircraft control inputs via an aircraft control router.
Figure 12:
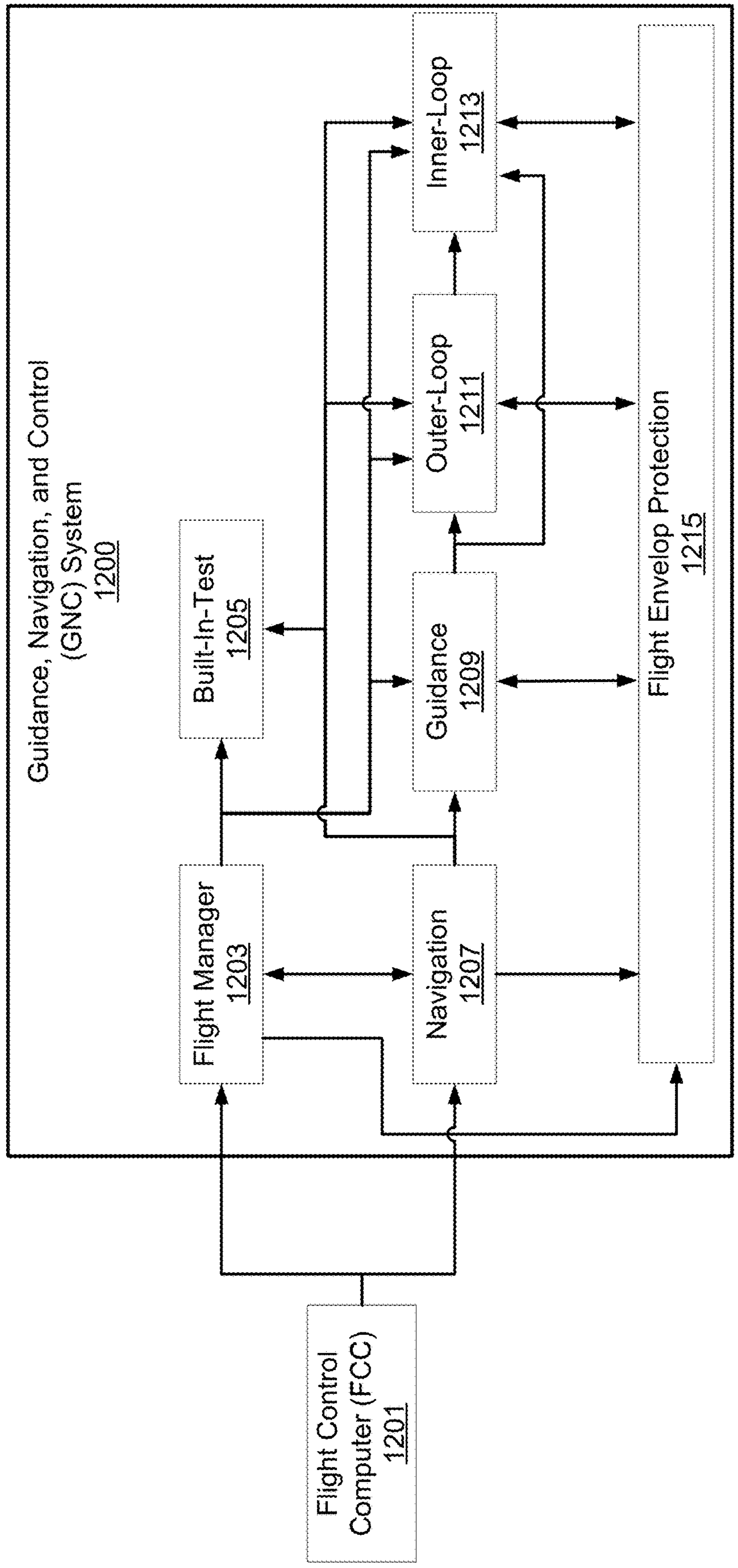
FIG. 12 is a block diagram of a guidance, navigation, and control (GNC) system for an aircraft, according to some embodiments.

Although the above descriptions describe a universal aircraft control router adapting to different aircraft states in the context of FIG. 3, these descriptions may similarly apply to other example embodiments of a universal aircraft control router, such as those described with respect to FIGS. 8 and 12. Furthermore, the above descriptions are not required to be implemented by a "universal" aircraft control router that receives "universal" control inputs. For example, a vehicle control router configured for an aircraft of a specific make and model may also implement the adaptive descriptions above.

Example Methods for Adapting to Degraded Flight States

FIG. 16 is a flow diagram illustrating a process 1600 for operating an aircraft flying through an environment, according to one or more embodiments. In the example shown, a vehicle control router 120 performs the steps of the process 1600. However, some or all of the steps may be performed by other entities or components. In addition, some embodiments may perform the steps in parallel, perform the steps in different orders, or perform different steps. The vehicle control router 120 may be an embodiment of the aircraft control router 310. Furthermore, the vehicle control router 120 may be integrated with one or more computer systems, such as the computer system 1700 described with reference to FIG. 17.

At step 1610, the vehicle control router 120 receives sensor data from one or more sensors of the aircraft.

At step 1620, the vehicle control router 120 determines, from the sensor data, a component of the aircraft is compromised. The compromised component may be a compromised sensor, a compromised actuator, or a compromised airframe component of the aircraft.

At step 1630, the vehicle control router 120 determines the aircraft is in a degraded flight state due to the compromised component. Previous to this determination, the vehicle control router 120 may be determined the aircraft was in a normal (non-degraded) flight state.

At step 1640, the vehicle control router 120 operates the aircraft according to the degraded flight state. Operating the aircraft according to the degraded flight state includes: (a) modifying one or more processing control loops based on the degraded flight state, the one or more processing control loops configured to generate actuator commands (e.g., sensor signals 360) according to a flight state of the aircraft (e.g., specified in the estimated aircraft state 340) and based on inputs from vehicle control interfaces (e.g., universal aircraft control inputs 330); and (b) generating (e.g., by the control laws module 375) an actuator command by applying the degraded flight state and a signal based on an input from a vehicle control interface to the modified one or more processing control loops. The signal may be an aircraft trajectory value (e.g., 370) generated by the command processing module 365 according to the degraded flight state and the input from the vehicle control interface (e.g., 305).

In some embodiments, operating the aircraft according to the degraded flight state does not change how a pilot of the aircraft interacts with the vehicle control interface. In some embodiments, a pilot of the aircraft interacts with the vehicle control interface to control the aircraft, and the generation of the actuator commands enables the pilot to continue interacting with the vehicle control interface during the degraded flight state in the same way as during a non-degraded flight state.

Modifying the one or more processing control loops may include modifying an outer processing control loop (e.g., in the control laws module 375) configured to apply a set of control laws to aircraft trajectory values based on inputs from the vehicle control interface, where the outer processing control loop is configured to output allowable aircraft trajectory values according to the set of control laws. The set of control laws may be selected from sets of control laws according to the degraded flight state of the aircraft. For example, there may be a different set of control laws for each possible degraded flight state, where each set is configured to accommodate the specific degraded state (e.g., accommodate the corresponding compromised component).

Modifying the one or more processing control loops may include modifying an inner processing control loop (e.g., in the control laws module 375) cascaded after an outer processing control loop, where the inner processing control loop is configured to convert aircraft trajectory values (e.g., 730) based on inputs from the vehicle control interface to the actuator commands.

Modifying the one or more processing control loops may include: (a) turning off a portion of a processing control loop; (b) turning off an integrator (e.g., in an inner processing loop); (c) turning off a controller in the one or more processing control loops, the controller configured to provide control along an axis of the aircraft; or (d) some combination thereof based on the degraded state (e.g., based on the compromised component).

In some situations, the compromised component may be a first sensor and data from the first sensor is used by a first portion of a processing control loop of the one or more processing control loops to determine a result. In these situations, modifying the one or more processing control loops may include: (a) turning off the first portion of the control processing loop, and (b) turning on a second portion of the processing control loop, the second portion of the processing control loop configured to determine the result using data from a second sensor different than the first sensor (e.g., the second sensor is a different sensor type or records a different type of data).

Second Example Vehicle Control Routers

Some embodiments described herein relate to a control system for a vehicle, such as an aircraft, with a complex or tight flight envelope (e.g., a helicopter). An outer control loop for the control system comprises commands in the user (e.g., pilot) coordinates (e.g., front, right, and down relative to the ground). The pilot (e.g., pilot) provides inputs in the user coordinates using a control stick and interface. An inner control loop comprises commands in the body coordinates (e.g., pitch, roll, and attitude relative to the aircraft body). A guidance loop comprises autopilot commands in earth coordinates (e.g., north, east, down). In the configuration described herein, the number of required maneuvers by the user are reduced and simplified by a control system that translates the front, right, down user coordinates into body coordinates of the inner control loop using a middle layer of control tied to a unique interface.

Furthermore, the configuration comprises a processing module that defines the priorities of the components of the control system and the control interface or "human-machine interface" (HMI), such as the priorities amongst a touchscreen, the control stick, macros, and autopilot programs. A user interacts with the HMI to control the aircraft. The HMI runs/is coupled to modules for executing multiple control loops that enable the user to control the substantially fully automated aircraft. The configuration can control 8 states, including pitch, roll, yaw, and angular rates. As such, the configuration is uniquely able to fully control bank angles from an estimate of down/up relative to the ground. The configuration generates commands that reduce the error between state estimations and actual states provided by sensor measurements. In typical configurations, the state estimation error can only by reduced in 4 degrees of freedom, as provided by 4 actuators/servos controlled by 4 actuators/servos coupled to the control stick. The processing module of the configuration programmatically determines 4 states amongst the 8 control states to prioritize when reducing the state estimation error depending on the commands provided by the user at a given point in time. Thus, more intuitive control of a flying vehicle is provided to a user using the vehicle control and interface system.

Referring to FIG. 8, FIG. 8 is a block diagram of a universal vehicle control router 820, in accordance with one or more embodiments. The universal vehicle control router 820 may be an example of the universal vehicle control router 120 described with respect to FIG. 1. Although the universal vehicle control router 820 and the universal aircraft control router 310 are described with respect to different figures, these routers and their components are not mutually exclusive. Modules, functionalities, descriptions, etc. described with respect to one of the routers (e.g., 310) may be applicable to the other router (e.g., 810). For example, descriptions of the outer control loop 821B may be applicable to the outer loop of the control laws module 375, and descriptions of the inner control loop 821C may be applicable to the inner loop of the control laws module 375. In another example, the flight control module 821 of FIG. 8 may be interchangeable with the command processing module 365 and control laws module 375 of FIG. 3.

The universal vehicle control router 800 is configured to convert universal vehicle control inputs from one or more universal vehicle control interfaces (e.g., 110 or 305) to a set of actuator commands (e.g., 380). The universal vehicle control router 800 comprises a flight control module 821, a navigation module 822, a communication module 823, a flight envelope module 824, and a prioritization module 825.

The flight control module 821 is configured to generate actuator commands by applying vehicle control inputs of the set of universal vehicle control inputs to a plurality of control loops. The flight control module 821 comprises a guidance control loop 821A, an outer control loop 821B, and an inner control loop 821C.

Figure 9:
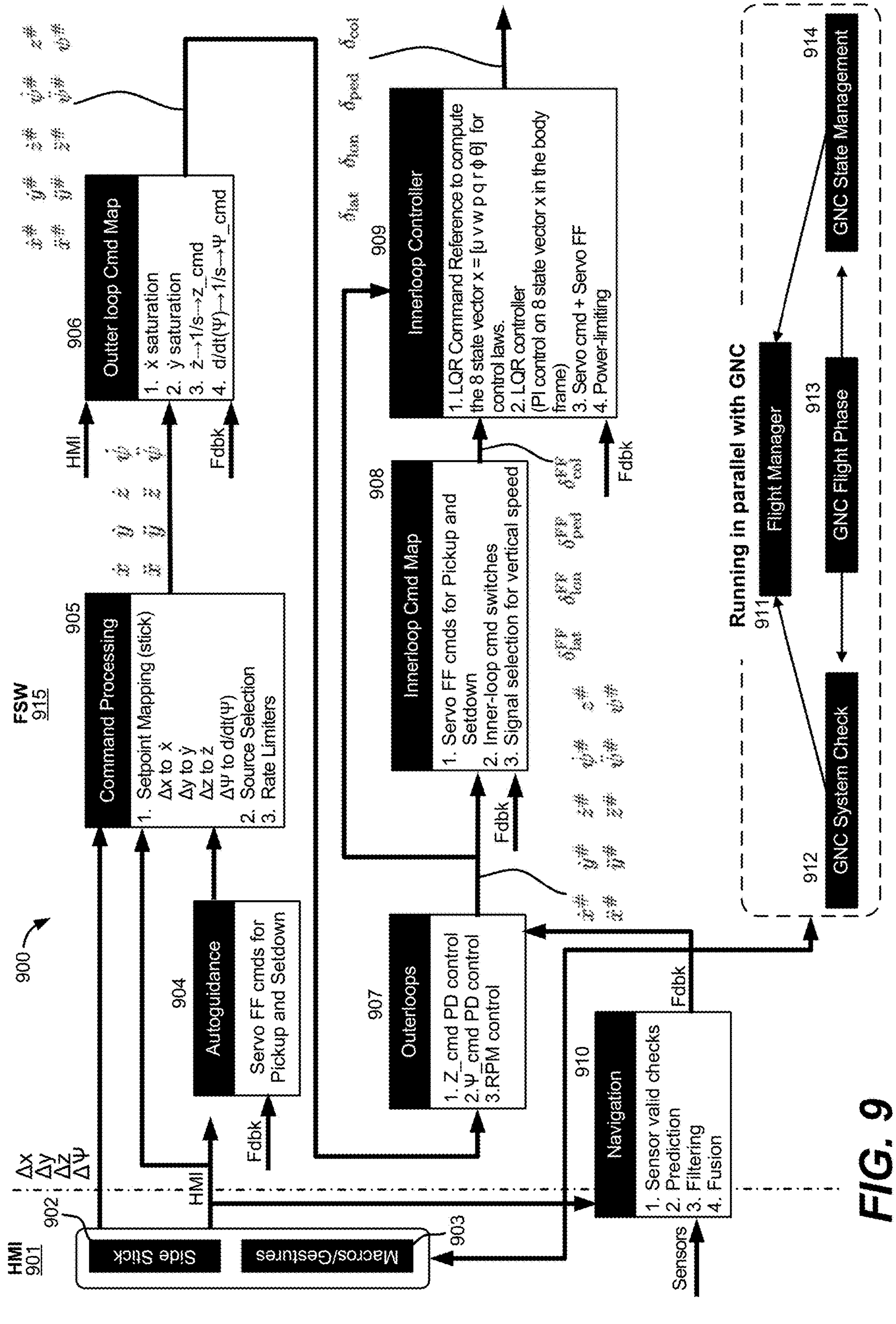
FIG. 9 is a flow diagram of vehicle control loops, in accordance with one or more embodiments.

The guidance control loop 821A is configured to generate actuator commands in earth coordinates. In some embodiments, the guidance control loop 821A may translate HMI commands obtained from a user, sensor data, and feedback to translate the HMI commands into feedforward commands for pick up and set down of the vehicle and achieving a suitable flight trajectory of the vehicle in earth coordinates. Further details are provided with respect to the description of autoguidance 904 of FIG. 9, provided further below.

The outer control loop 821B is configured to generate actuator commands in user coordinates. For example, an outer loop command mapping may be used to translate commands output from the prioritization module 825 to a refined set of actuator commands based on the user's selected inputs to the HMI and rate limits imposed on the vehicle. Further details are provided with respect to the description of command processing 905 of FIG. 9, provided further below.

The inner control loop 821C is configured to reduce an error of a plurality of state estimations by generating actuator commands in body coordinates. At least some of the plurality of state estimations are associated with the user coordinates of the outer control loop. Further details are provided with respect to the description of inner loop command map 908 and inner loop controller 909 of FIG. 9, provided further below. In some embodiments, the user coordinates may relate to universal vehicle control inputs for a front velocity, a right velocity, a downward velocity, and a yaw rate. As used herein, "a front velocity" may refer to the speed of a flying vehicle in the direction of its flight path. As used herein, "a right velocity" may refer to the speed of a flying vehicle in the starboard direction.

The navigation module 822 is configured to determine a plurality of state estimations based on in-flight measurements obtained by one or more vehicle sensors. In some embodiments, the navigation module 822 comprises a sensor valid model for verifying and validating raw sensor data (e.g., passing checksums, reasonable values, status flags acceptable, other sensor validation checks, or some combination thereof). The navigation module 822 may further comprise a sky navigation (SkyNav) model for taking the outputs of the sensor valid model as input and performing sensor fusion and other processing on the valid sensor data.

The communication module 823 is configured to receive, send, format, and reformat data messages and other exchanges of information between the universal vehicle control router 820 and other components of the vehicle control and interface system (e.g., 100).

The flight envelope module 824 includes a data structure that comprises a flight envelope for a vehicle controlled by the vehicle control and interface system (e.g., 100). For example, the prioritization module 825 may perform saturation and enforce rate limits on commands to ensure command rates remain within the flight envelope specified in the flight envelope module 824.

The prioritization module 825 is configured to prioritize, in substantially real-time, each universal vehicle control input in the set of universal vehicle control inputs received by the set of universal vehicle control interfaces prior to applying the universal vehicle control inputs to the plurality of control loops by the flight control module 821. The configurations with respect to the prioritization module 825 and the prioritization of vehicle control inputs are described in greater detail with respect command processing 905 of FIG. 9 below.

FIG. 9 is a flow diagram of vehicle control loops, in accordance with one or more embodiments. Process flow 900 comprises HMI 901 and flight software (FSW) 915, also referred to as "control loops" or "vehicle control loops." In the example of FIG. 9, HMI 901 includes side stick 902 (e.g., 240) and macros/gestures 903, however other control interfaces (e.g., 110) may be used. The macros/gestures 903 may include inputs made to a touch interface (e.g., any of the touch/display interfaces of 200 in FIG. 2).

Inputs to the HMI 901 provide user coordinate inputs delta-x, delta-y, delta-z, and delta-psi (i.e., displacements in front/back, right/left, up/down, clockwise/counter-clockwise, shown in FIG. 9 as $\Delta x$, $\Delta y$, $\Delta z$, and $\Delta\psi$ respectively, as inputs to sidestick 240 and/or macros or gestures 903 to primary vehicle control interface 220) to command processing 905. Furthermore, HMI inputs and feedback between autoguidance 904, also referred to as "autopilot," and the HMI 901 are provided as inputs to command processing 905. The command processing 905 determines rates from the inputs to the command processing, including xdot, ydot, zdot, and psi-dot (i.e., x velocity, y velocity, z velocity, and angular rates, shown in FIG. 9 as $\dot{x}$, $\dot{y}$, $\dot{z}$, and $\dot{\psi}$ respectively), which are input, along with HMI inputs and additional autoguidance 904 feedback to the outerloop command map 906. For example, the command processing 905 may translate delta-x, delta-y, delta-z, and psi, to xdot, ydot, zdot, and psi-dot respectively by mapping setpoints of the side stick 902 to a corresponding rate estimate.

The outerloop command (cmd) map 906 (also referred to as "outerloop cmd mapping" or "outerloop cmd mapping module") takes said inputs, including xdot, ydot, zdot, and psidot, and outputs limited rates xdot*, ydot*, zdot*, and psi-dot* (shown in FIG. 9 as $\dot{x}^*$, $\dot{y}^*$, $\dot{z}^*$, and $\dot{\psi}^*$ respectively), limited up/down displacement z*, accelerations x-double-dot (xddot), y-double-dot (yDdot), z-double-dot (zDdot), psi-double-dot (psiDdot) (shown in FIG. 9 as $\ddot{x}$, $\ddot{y}$, $\ddot{z}$, $\ddot{\psi}$), and limited clockwise/counter-clockwise displacement and psi* (shown in FIG. 9 as $\psi^*$) to the outerloops 907. The outerloops 907 may also be referred to as an "outerloop controller." The combination of the outerloop cmd map 906 and outerloops 907 or "outerloop controller" may be referred to as an "outer control loop."

The outerloops 907 provide as output, altered inputs xdot #, ydot #, zdot #, psidot #, z #, xDdot #, yDdot #, zDdot #, psiDdot #, psi #(shown in FIG. 9 as $\dot{x}^\#$, $\dot{y}^\#$, $\dot{z}^\#$, $\dot{\psi}^\#$, $\ddot{x}^\#$, $\ddot{z}^\#$, $\ddot{y}^\#$, $\ddot{z}^\#$, $\ddot{\psi}^\#$, and $\psi^\#$ respectively), which may be alterations of the outputs of corresponding outerloop command map 906 that are provided as input to an inner loop cmd map 908. The combination of the innerloop cmd map 908 (also referred to herein as "innerloop cmd mapping" or "innerloop cmd mapping module") and the innerloop controller 909 (also referred to herein as "inner loops") may be referred to as an "inner control loop."

The innerloop cmd map 908 receives the output/commands from the outerloops 907 and feedback as input and routes the commands to the appropriate inner loop command. As output, the innerloop may provide feed forward commands deltaFFlat, deltaFFlon, deltaFFped, deltaFFcol (shown in FIG. 9 as $$\delta_{lat}^{FF},\ \delta_{lon}^{FF},\ \delta_{ped}^{FF},\ \delta_{col}^{FF}$$

respectively) to the innerloop controller 909, which may relate to the 4 corresponding control servos: latitude, longitude, and center of lift, or LAT/LON/PED/COL respectively of the guidance, navigation, and control system.

The innerloop controller 909 (also "interloop controller module 909") performs command response, feedback control, and servo command management. The innerloop controller 909 receives the feed forward commands from the innerloop cmd mpa 908 and, in conjunction with feedback, outputs augmented commands deltalat, deltalon, deltaped, deltacol (shown in FIG. 9 as $\delta_{lat}$, $\delta_{lon}$, $\delta_{ped}$, $\delta_{col}$ respectively), which may be augmented commands of corresponding feed forward commands received from the innerloop cmd map 908 for providing input to the 4 corresponding control servos: LAT/LON/PED/COL.

The navigation 910 (also referred to as a "navigation stack," "navigation module," or "navigation solution") receives sensor data/measurements and performs sensor validation checks, makes predictions, performs filtering, and sensor fusion.

Running in parallel with the guidance, navigation, and control (GNC) system is the flight manager 911, the guidance, navigation, and control (GNC) system check 912, the GNC flight phase 913, and the GNC state management 914.

HMI

In some embodiments, the HMI (Human Machine Interface) Communication Model 901 comprises 3 main interfaces: (1) a primary-function display (PFD), a multi-function display (MFD), and a control stick, also referred to herein as a "joystick" or "sidestick." In some embodiments, the HMI communication model 901 may be configuration 200 of FIG. 2. The PFD may be primary vehicle control interface 220. The MFD may be multi-function interface 230. The control stick may be the inceptor device 240.

The touch-display (e.g., tablet device) may have a split-screen format with 2 main sections of the display being the primary-function display (PFD) and multi-function display (MFD).

Primary-function display (PFD): The PFD provides swipe gesture control to the user in the form of a forward/back, right/left, up/down, clockwise/counter-clockwise touch gestures to command the aircraft in a particular direction, speed, or altitude. The PFD also provides functionality to enter macro commands. The macro commands use a numeric touchpad prompt to command the aircraft in a particular direction, speed, or altitude instead of using the swipe gestures. Additionally, the PFD provides the ability to perform and auto-pickup and auto-setdown.

Multi-function display (MFD): The Multi-function display may be used for testing purposes, such as live-gain tuning of the controller, system-identification, autorotation commands, system resets, etc.

Side-Stick/Joystick: The joystick or sidestick inceptor is another type of interface that can be used to control the aircraft. The joystick is a multi-axis stick that commands accelerations to the aircraft in the direction of stick deflection. It can be used to command in the forward/back, right/left directions, clockwise/counter-clockwise direction by twisting the stick, and up/down by use of a spring-loaded wheel on the stick.

Navigation

The navigation module 822 may include a navigation stack. The navigation stack may comprise of 2 models, including a sensor valid model and a sky navigation (SkyNav) model. The sensor valid model verifies that the raw sensor data is valid (e.g., passing checksums, reasonable values, status flags acceptable, etc.). The sensor valid model then outputs the validated data to the SkyNav model. The SkyNav model uses the validated data as its primary input and processes/fuses the data into a clean navigation solution. The navigation solution is performed, executed, and generated by steps (1)-(4). Step (1) includes filtering and calibrating the validated sensor data into clean, accurate measurements. This sensor data may include air data, magnetometers, inertial measurement units, Lidars, GPS receiver data, or some combination thereof. Step (2) includes inputting filtered sensor data into an Extended Kalman Filter (EKF) that fuses the measurements into an accurate, air-referenced state estimate. The output of this EKF includes vehicle attitude and velocity information. At step (3), the state estimate output from the EKF is combined with ground-referenced altimeter measurements, including Lidar and radar data, to provide height above ground level data. This height above ground level data is fused using a Kalman Filter to generate a robust altitude above ground level estimate. At step (4), the estimated attitude, position, and velocity (among other vehicle states) is combined into a single clean navigation solution. structure. This structure (SkyNav solution bus) may be used by the guidance, navigation, and control (GNC) models to guide and control the vehicle.

Flight Manager

The Flight Manager module 911 performs the GNC system level state transition logic, based upon the flight condition solution from the navigation module, user input through the HMI, and the current GNC software state. In some embodiments, the Flight Manager may be stored in navigation module 822 of FIG. 8. In some embodiments, outputs may include: GNC system state (see table in FIG. 10), pickup/setdown maneuver in progress flags, skids on/off ground indication, and auto-hover and setdown available indications to the user.

Auto Guidance

The Auto Guidance module 904 may be broken up into 6 main features; auto-pickup/auto-setdown, auto-hover, auto-cruise, autorotation, station keeping controllers, and macros. In some embodiments, the Auto Guidance may be stored in the flight control module 821 of FIG. 8. The auto-pickup/auto-setdown provides the automated commands when a user initiates an auto-pickup/auto-setdown. This may be done by ramping up to a desired vertical velocity command and ramping down such that the aircraft reaches a desired altitude. The auto-hover provides a means to switch between piloted state and the auto-pickup/auto-setdown where the aircraft will hold its current position. The auto-hover generate the position commands based on where it was at (latitude, longitude, altitude, and heading) prior to entering the auto-hover state. The auto-cruise provides the ability to perform waypoint following where the commands are generated such that the desired path is followed. The auto cruise develops the forward, lateral, vertical velocity, and turn rate commands based on a desired path. The autorotation guidance provides the necessary commands to perform the glide, flare and setdown phases of an autorotation. During the glide the autorotation guidance may generate a desired rotor rpm command. During the flare the autorotation guidance will generate a desired rotor rpm, forward velocity, altitude command. The station keeping controllers provides the means to hold the lateral and longitudinal position of the aircraft when performing an auto-pickup/auto-setdown and while in auto-hover. The macros provide the ability to enter in a desired speed, altitude, or heading and have the necessary forward, vertical velocity, and turn rate commands auto generated.

GNC System Check

The GNC system check module 912 is configured ensure that the aircraft is in a state where the clutches can be engaged safely. In some embodiments, the GNC system check model may be stored in the navigation module 822. When the user swipes to unlock FlightOS (e.g., of flow process 900), the GNC system check model may run a series of checks to determine whether the 4 control servos: LAT/LON/PED/COL are in proper alignment and under a given threshold of their trim conditions for clutch engagement where the user's manual control is transferred from the aircraft's conventional control system to the FlightOS autopilot. In an embodiment, if and only if all the checks pass will the system allow the clutches to engage.

Command (cmd) Processing

The command processing module 905 may accept inputs from the inceptors/interfaces as well as auto guidance, and maps those inputs to velocity commands which are passed to the outerloop controller. In some embodiments, the command processing model may be stored in prioritization module 825. For lateral stick and gesture inputs (right, twist), the command on which they act is dependent on flight state (hover/forward) which is determined by forward velocity command. Stick inputs in each axis enter command processing as normalized deflections in the range [−1, 1] (0 when undeflected) and are mapped to (xDdot, yDdot/psiDdot, zDdot, and psi-dot/beta) respectively. Acceleration (Ddot) inputs are integrated to velocity commands, while velocity commands (dot) are passed directly. Gesture inputs in each axis enter command processing as normalized velocity commands in the range [−1, 1] (0 when command is zeroed, 1 when command is maxed) and are mapped to (xdot, ydot/psidot, zdot, and psidot/beta) respectively. Macro inputs enter command processing as absolute commands in xdot, altitude, and heading+rotation direction. These commands are mapped to xdot, zdot, and psidot respectively using a dynamic rate limiter to smoothly transition to commanded macro states. Auto guidance inputs enter command processing as velocity commands and are passed through directly when FlightOS is in auto-guidance state. When in manual flight state, the inceptor to be used is chosen by a priority scheme, e.g., stick (highest)→gesture→macro (lowest). Commands may be chosen independently in each axis, e.g., a forward gesture could be given while an altitude macro may be active, and the stick is commanding yaw rate. Saturation and rate limits may be applied to all four commands to ensure command and command rates remain within the safe operating envelope of the aircraft. The limits may be determined based on the operating condition and power consumption of the aircraft.

Outerloop Command (Cmd) Mapping

The inputs for the outer loop cmd mapping 906 may include the xdot, ydot, zdot, psidot commands generated by the command processing. In some embodiments, outer loop cmd mapping may be stored in outer control loop 121B. The outputs include outer loop commands and processed xdot, ydot, zdot, and psidot commands. The primary function outer loop cmd mapping generates commands for the outer loop controllers that are consistent with the commands being provided by the user and processed in command (cmd) processing.

In some embodiments, 2 outer loop commands may be generated: (1) Altitude command is generated by integrating the cmd processing zdot cmd; and (2) Heading command is generated by integrating the cmd processing psidot cmd. These outer loop commands may be limited and reset appropriately when different states or limitations are triggered. The secondary function of this module may be to apply an necessary limits to the xdot, ydot, zdot, and psidot commands that get passed downstream.

Outerloop Controller

The outerloop controller module 907 may comprise of 5 separate outer loop controllers. In some embodiments, outerloop controller is stored in outer control loop 121B. These controllers accept inputs of outer loop commands and navigation signals to augment the desired xdot, zdot, and psidot commands to maintain the desired outer loop command. In some embodiments, the outerloop controllers may comprise a nominal flight altitude controller, a heading controller, an RPM to zdot controller, an RPM to xdot controller, and an altitude to zdot controller.

The nominal flight altitude controller uses altitude command and feedback to augment the climb rate cmd to maintain desired altitude.

The heading controller uses heading command and feedback to augment the heading rate cmd to maintain desired heading.

The RPM to zdot controller uses RPM command and feedback to augment the climb rate cmd to maintain desired RPM in an engine out/autorotation glide.

The RPM to xdot controller uses RPM command and feedback to assist in maintaining the rotor rpm during the entry to glide phase of an autorotation. The RPM to xdot controller further uses RPM command and feedback to augment the xdot cmd to maintain rotor rpm while in the flare phase of an autorotation.

The altitude to zdot controller uses altitude command and feedback to augment the climb rate cmd to maintain desired altitude during the flare phase of an autorotation.

Innerloop Command (Cmd) Mapping

The inner loop cmd mapping module 908 may be used for routing commands from the outer loops to the appropriate inner loop command. The inner loop cmd mapping module may be configured to handle switching of command sources depending on the control state. For example, the inner loop zdot command source may comprise the altitude controller during powered flight and may comprise the RPM to zdot controller during autorotation. Front, right, down, and yaw acceleration may also be switched on when in user state. The servo feed forward commands for pickup and setdown are also generated and routed to the inner loop in the innerloop command mapping module.

Innerloop Controller

The inner loop controller module 909 is relatively complex performing a number of functions, including: 1) command response; 2) feedback controller; and 3) servo command management (e.g., limiting, resetting, and windup protection). In some embodiments, the inner loop controller module may be stored in inner control loop 121C. The command response model generates the 8 commands used in the feedback controller (u, v, w, p, q, r, phi, theta) by rotating the 4 xdot, ydot, zdot, and psidot commands with Euler angles into the body frame (U, V, W, and R) and constraining the other commands with desired flight dynamics, e.g., coordinated turns or zero sideslip. The feedback controller applies proportional and integral gains to the full state error, which is the difference between the commands and the feedback from the navigation. The key functions of the controller may comprise stabilizing the dynamics of the airframe and respond to the commands while closing steady state error on the u, v, w, and r states. Servo limits may be implemented to prevent damage to the servos or engine, and these limits are either hard coded or dynamically calculated based on the aircraft state. When limited the integrators are managed appropriately to prevent unwanted dynamics (e.g., windup). After pickup and setdown maneuvers, the servo commands may be reset to maintain center sticks while on the ground.

Figure 11:
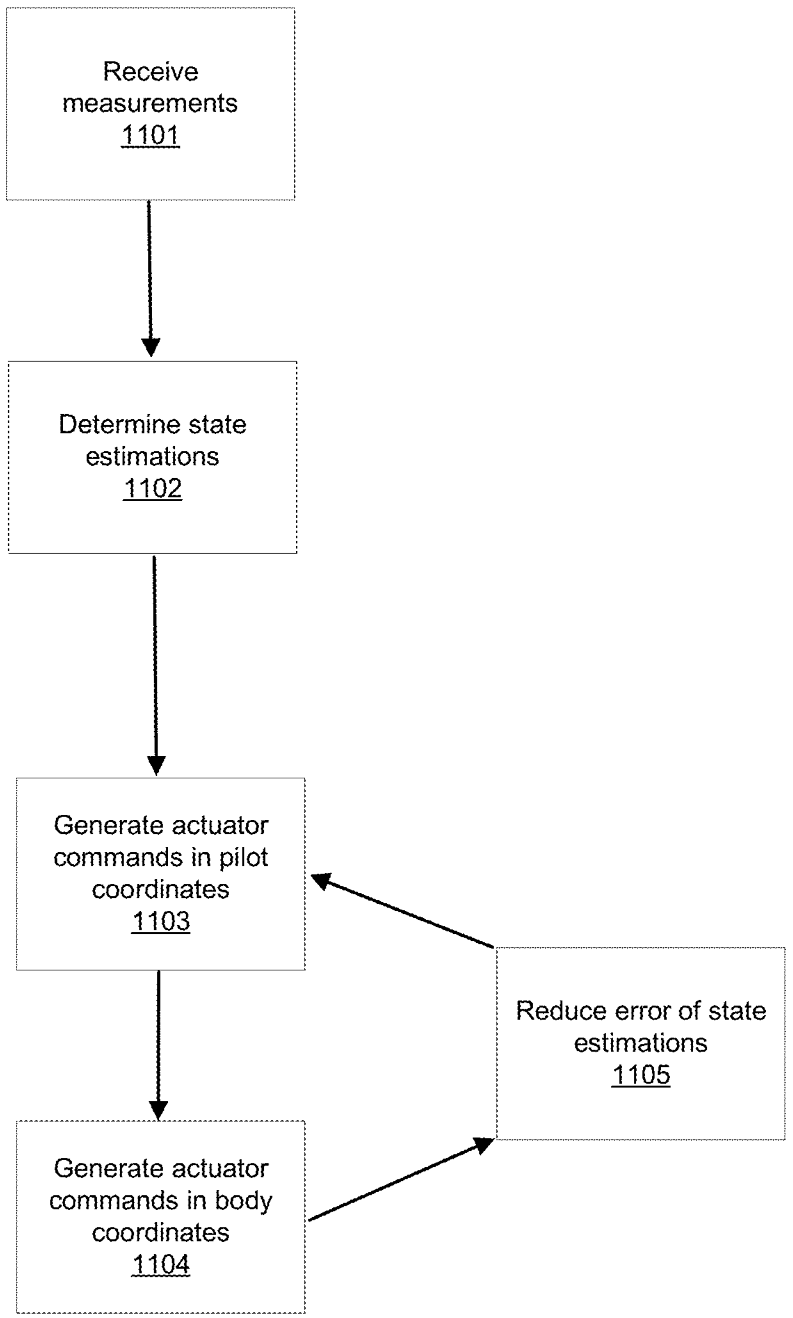
FIG. 11 is a flowchart of a process for converting universal vehicle control inputs to a set of actuator commands in accordance with one or more embodiments.

FIG. 11 is a flowchart of a process for converting universal vehicle control inputs to a set of actuator commands in accordance with one or more embodiments. The process shown in FIG. 11 may be performed by components of a vehicle control and interface system (e.g., the system 100). Other entities may perform some or all of the steps in FIG. 11 in other embodiments. Embodiments may include different and/or additional steps, or perform the steps in different orders.

The system 100 receives 1101 sensor measurements. The measurements may comprise in-flight measurements obtained by one or more vehicle sensors.

The system 100 determines 1102 state estimations. For example, a navigation module (e.g., 822) may be configured to determine a plurality of state estimations based on the in-flight measurements obtained by the one or more vehicle sensors.

The processor generates 1103 actuator commands in user coordinates. For example, a flight control module (e.g., 821) may be configured to generate actuator commands by applying vehicle control inputs from a set of universal vehicle control inputs to a plurality of control loops. The plurality of control loops may comprise an outer control loop configured to generate the actuator commands in the user coordinates. The user coordinates may relate to universal vehicle control inputs for a front velocity, a right velocity, a downward velocity, and a yaw rate.

The processor generates 1104 actuator commands in body coordinates. For example, the flight control module may further comprise an inner loop that generates the actuator commands in the body coordinates. In some embodiments, the actuator commands are transmitted to the actuators of a vehicle (e.g., vehicle actuators 130) to control their linear and/or rotational movements and alter the control surface of the vehicle. For example, signals may be transmitted to one or more control servos or servomotors.

The processor reduces 1105 an error of the state estimations. The inner control loop may be configured to reduce the error of at least some of the state estimations by generating the actuator commands in the body coordinates. At least some of the state estimations may be associated with the user coordinates of the outer control loop.

Third Example Vehicle Control Routers

FIG. 12 is a block diagram of a guidance, navigation, and control (GNC) system 1200 for an aircraft, according to some embodiments. The GNC system 1200 may be an example universal vehicle control router 120 described with respect to FIG. 1. Although the system GNC 1200, the universal vehicle control router 820, and the universal aircraft control router 310 are described with respect to different figures, these example routers and their components are not mutually exclusive. Modules, functionalities, descriptions, etc. described with respect to one of the FIGS (e.g., FIG. 12) may be applicable to either of the other FIGS. (e.g., FIGS. 3 and 8). For example, descriptions of the outer-loop 1211 may be applicable to the outer loop of the control laws module 375, and descriptions of the inner-loop 1213 may be applicable to the inner loop of the control laws module 375.

The GNC system 1200 includes of several modules that interact with each other to provide (e.g., simplified) vehicle operations (SVO) across multiple control interfaces (e.g., 110) available to a user (e.g., pilot). Example control interfaces (e.g., 110) include a control stick, touchpad inceptor, AutoFlight, and FlightPlan. AutoFlight is an autopilot module (e.g., configured to generate control inputs). FlightPlan is a module configured to generate control inputs which enable the vehicle to automatically perform specific functions for the user (e.g., pickup, setdown, speed capture, or altitude capture). The interactions between different modules (e.g., inputs and outputs) are illustrated in FIG. 12 via arrows.

The GNC system 1200 receives (or retrieves) inputs from the flight control computer (FCC) 1201 (e.g., HMI inputs (e.g., control inputs from control interfaces 110) and data from sensors 140 (e.g., 360) are processed by the FCC 1201 before being passed to the GNC system 1200). The GNC system 1200 interprets the inputs from the FCC 1201 and generates commands that (e.g., simultaneously) satisfy the user's intent while protecting the user and airframe of the aircraft.

In the example of FIG. 12, the modules of the GNC system 1200 that enable operation are the Flight Manager module 1203, Guidance module 1209, Outer-loop module 1211, and Dynamic Flight Envelope Protection module 1215 (collectively referred to as the "primary" modules). These primary modules interact with other modules of the GNC system 1200, such as the inner-loop module 1213, the build-in-test module 1205 and the navigation module 1207 in order to achieve the desired response (desired response in this context refers to the vehicle response due to a given command. For example, it is the appropriately shaped and protected vehicle response generated from a command that is input from the user (e.g., via interaction with a control interface 110). In some cases, such as low-g protection, it is a generated command that automatically protects the user without any input from the user). Among other advantages, capabilities provided by the GNC system (e.g., via the primary modules) include the ability to (1) intuitively layer or stack commands from multiple input sources (e.g., 110); (2) provide seamless protection across any combination of inputs; and (3) shape the response across different input sources to provide an intuitive feel-system.

The flight manager module 1203 is the primary coordination module across the GNC system 1200. The flight manager 1203 determines the GNC system state (example states include hover, autorotation, on-ground, and up and away flight) based upon the sensor health, aircraft system health (e.g., engine health), phase of flight, and user (e.g., pilot) input through the HMI. Sensor health is determined by voting redundant sensors and via monitors that check for values being within desired thresholds based on vehicle operation. If a certain sensor is not available, then a feature associated with that sensor may not be available (as previously discussed above in the "Adapting to Degraded Flight States" section). For example, if the above ground radar is unavailable or unfunctional, then bottom out protection would not be available since there may be no way to detect exactly where the ground is when flying above it. The flight manager 1203 may turn on/off different controllers and protection logic within modules of the GNC system. The flight manager may provide indications to the display (e.g., 210) of what and when the controllers/protection logic are active.

The flight manager 1203 may identify operational flight states of the aircraft (and whether those states are normal or degraded states). As previously described, the flight states may include autorotation states and even specific autorotation sub-states, such as entry to glide, glide, flare, and letdown. Other example flight states include degraded hover-taxi, normal hover-taxi, normal up and away flight, degraded pickup or setdown, manual pickup or setdown, and auto pickup or setdown. Other states may be identified based on learnings in flight test.

Figure 13:
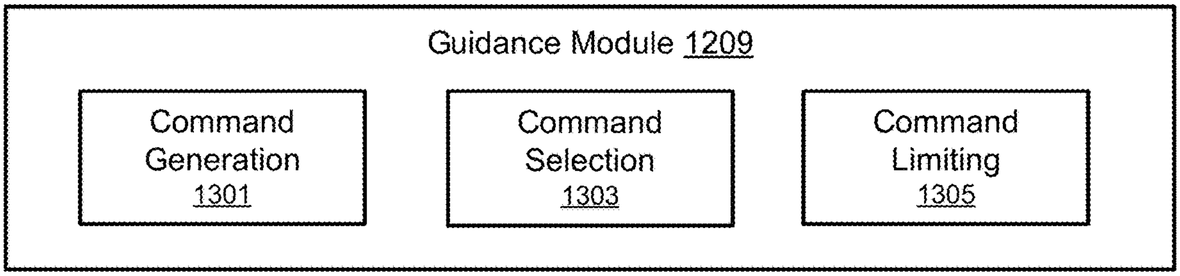
FIG. 13 is a block diagram of a guidance module, according to some embodiments.

The guidance module 1209 is further described with respect to FIG. 13. FIG. 13 is a block diagram of the guidance module 1209, according to some embodiments. In the example of FIG. 13, the guidance module 1209 includes three modules that govern how the GNC system 1200 behaves based on inputs from the HMI and flight state as determined by the flight manager module 1203. These modules include the command generation 1301, command selection 1303, and command limiting modules 1305.

The command generation module 1301 generates commands based on HMI inputs (in this context, the generated command may be a velocity command or attitude command, which eventually is converted into a vehicle actuator command. The command is shaped so that it is intuitive). Example HMI inputs include side-stick, touch-pad inceptor, AutoFlight (e.g., includes automatic pickup/setdown and "hold" commands), and FlightPlan. For example, the command generation module receives inputs from different types of HMI inputs and interprets and synthesizes the inputs to generate an output command. For example, inputs from each control interface may be interpreted differently based on how the user interacts with the interface, but the generated output commands may behave in a way that is intuitive and has harmony with a different inceptor. For example, a swipe up on the display (e.g., 220) gives a velocity command that is based on the speed of the swiping motion. Similarly, if the pilot moves the stick forward quickly, the associated velocity command may follow a similar profile.

Commands may be shaped by the command generation module 1301 to provide intuitive response across different input options. Command shaping relates to how an input from a control interface is interpreted into the final command. Generally, that means defining what command each position of the stick (or other control interface) corresponds to. The command may be shaped so that when deflecting (e.g., the stick), the response is intuitive (e.g., a little deflection gives a little command and a lot of deflection give polynomially more response). To make the responses intuitive, the current aircraft flight state and how the user interacts with a specific control interface (e.g., aggressively or slowly) may be the primary parameters considered. Logic based on the type of control interface used is also considered. For example, the amount of touchpad available on the screen (e.g., 220) determines the resolution for a swipe gesture so it feels natural or "intuitive" to the user. The command generation module may handle command shaping across transition regions (e.g., hover to above ETL and back). The transition region is the region where vehicle aerodynamics change in flight (e.g., generally around 15-30 kts in an R66 helicopter). For example, for a rotary-wing aircraft, the system may intelligently blend how the vehicle operates in hover versus in up and away flight so while going between these two flight states, the vehicle behaves intuitively.

The command generation module 3101 may determine when extended envelop protection should be used. Relative to flight envelop protection, extended envelop protection may provide the user more vehicle performance by extending certain system limits of the flight envelop protection. A user may indicate they want to use extended envelope protection by deflects the stick past a certain threshold while also moving it aggressively.

The command selection module 1303 determines which HMI inputs are selected based on priorities for the HMI inputs. For example: Stick (highest)->TPI->AutoFlight->FlightPlan (lowest). The command selection module 1303 may "stack" or layer commands across different command inputs. Two different commands in the same axis may be prioritized based on priority of the commands. Furthermore, commands in different axes may be added together.

Input layering allows a user to add a command in an axis, then add a command in another axis (or the same axis) and have that command persist without holding it in the system. Conceptually, input layering enables axis-by-axis cruise-control but with finer control on what is added. Command selection 1303 is the module that actually performs the layering. Command generation 1301 creates the command that will be layered by the command selection module 1303.

The command limiting module 1305 limits the maximum input and output of what can be commanded based on one or more criteria (e.g., acceleration limits of the vehicle). The limits determined by the limiting module may be based on the determined state of the vehicle and operational limits of the vehicle. The limits set by the commend limiting module may be separate and complementary to limits of the flight envelope protection.

Figure 14:
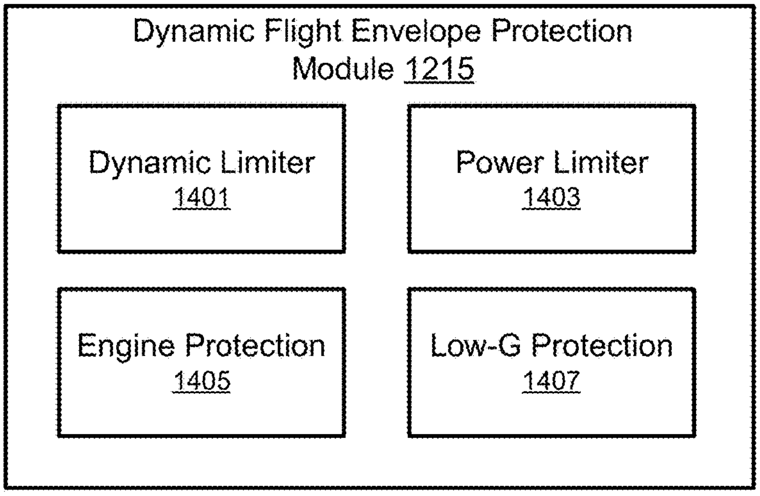
FIG. 14 is a block diagram of a dynamic flight envelope protection module, according to some embodiments.

The dynamic flight envelope protection module 1215 produces system limits to protect the flight envelope of the vehicle. The dynamic flight envelope protection module is further described with respect to FIG. 14. FIG. 14 is a block diagram of a dynamic flight envelope protection module 1215, according to some embodiments. In the example of FIG. 14, the dynamic flight envelope protection module 1215 includes a dynamic limiter module 1401, a power limiter module 1403, an engine protection module 1405, and a low-G protection module 1407.

As illustrated in FIG. 12, inputs to the dynamic flight envelope protection module 1215 are received from the flight manager module 1203, the navigation module 1207, the guidance module 1209, the outer-loop module 1211, and the inner-loop module 1213. Furthermore, outputs of the dynamic flight envelope protection module 1215 (e.g., determined control limits) are received by the guidance module 1209, the outer-loop module 1211, and the inner-loop module 1213.

The dynamic limiter module 1401 generates velocity and altitude limits based on airframe capabilities of the vehicle. The power limiter module 1403 generates limits to protect against over-driving the engine power from excessive commands (e.g., in velocity, climbs, and turns). The engine protection module 1405 generates limits to protect the engine, for example, from rotor overspeed, engine over-torque, and engine overheating. The low-G protection module 1407 generates corrective commands when a low-g incident is detected (a low-G incident may be determined based on data from one or more sensors (e.g., 140).

Limits from the dynamic flight envelope protection module 1215 may be exceeded, as necessary, upon pilot discretion (e.g., in emergency situations).

Figure 15:
FIG. 15 is a diagram of an interface that may be presented to a user, according to some embodiments.

Display notifications (e.g., on 220 or 230) may indicate to the user (e.g., pilot) when different components of envelope protection are active. For example, in the interface of FIG. 15, an indicator (upper right corner) indicates that envelope protection is disabled.

In some embodiments, the GNC system 1200 may utilize user meta-data to improve (e.g., optimize) feel-system based on actual usage.

In some embodiments, the GNC system 1200 may provide the ability to have multiple envelop protection settings based on user (e.g., pilot) skill-set.

Example Vehicle Control Interfaces

Referring to FIGS. 4, 5, and 6A-D, these FIGS. illustrate embodiments of universal aircraft control inputs and interfaces. For example, the interfaces illustrated by in FIGS. 6A-D may be example embodiments of the universal vehicle control interfaces 110, e.g., which may be rendered and interacted with through on a touch sensitive display. Although the embodiments depicted in FIGS. 4, 5, and 6A-D are particularly directed to operating an aircraft (e.g., a rotorcraft or fixed-wing aircraft), one skilled in the art will appreciate that similar interfaces can be applied to other vehicles, such as motor vehicles or watercraft.

Figure 4:
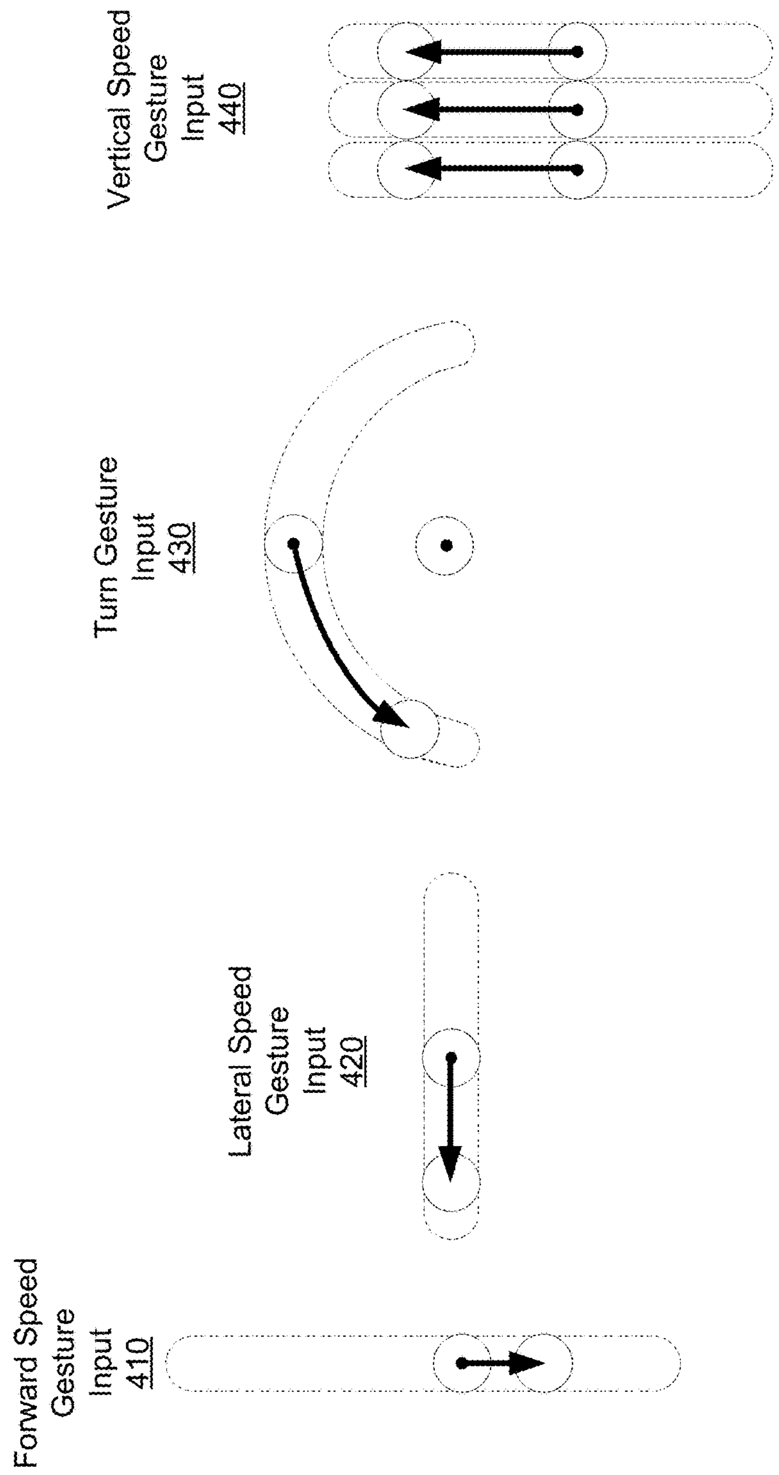
FIG. 4 illustrates one example embodiment of a gesture display configured to provide universal aircraft control inputs for controlling an aircraft.

FIG. 4 illustrates one embodiment of a set of gesture inputs 400 to a gesture interface configured to provide universal aircraft control inputs on a touch sensitive display for controlling an aircraft. As an example, the set of gesture inputs 400 may be received via one of the aircraft interfaces 305. For example, the gesture inputs 400 may be received by the gesture interface 320. In the embodiment shown, the set of gesture inputs 400 include a forward speed gesture input 410, a lateral speed gesture input 420, a turn gesture input 430, and a vertical speed gesture input 440. In other embodiments, the set of gesture inputs 400 may include fewer, more, or different control inputs.

As depicted in FIG. 4, the gesture inputs 410, 420, 430, and 440 illustrate example finger movements from an initial touch position, indicated by circles with black dots, to a final touch position, indicated by circles pointed to by arrows extending from the initial touch positions. The arrows illustrate an example direction of movement for the gesture inputs 410, 420, 430, and 440. As depicted in FIG. 4, the forward speed gesture input 410 illustrates a downward single finger swipe gesture indicating a decrease in aircraft forward speed. The lateral speed gesture input 420 illustrates a leftward single finger swipe gesture indicating a leftward increase in aircraft lateral speed. The turn gesture input 430 illustrates a counter-clockwise double finger swipe gesture indicating a counter-clockwise change in aircraft turn rate, where, e.g., an index finger of a user may be placed at the top initial touch position and the thumb of the user may be placed at the bottom initial touch position. Finally, the vertical speed gesture input 440 illustrates a three-finger upward swipe to indicate an increase in aircraft altitude.

The gesture inputs 410, 420, 430, and 440 further include possible movement regions (indicated by the dashed lines) that indicate a range of possible movements for each of the gesture inputs 410, 420, 430, and 440. For instance, as depicted in FIG. 4 the forward speed gesture input may be a leftward swipe to decrease aircraft forward speed or an upward swipe to increase aircraft forward speed.

Figure 5:
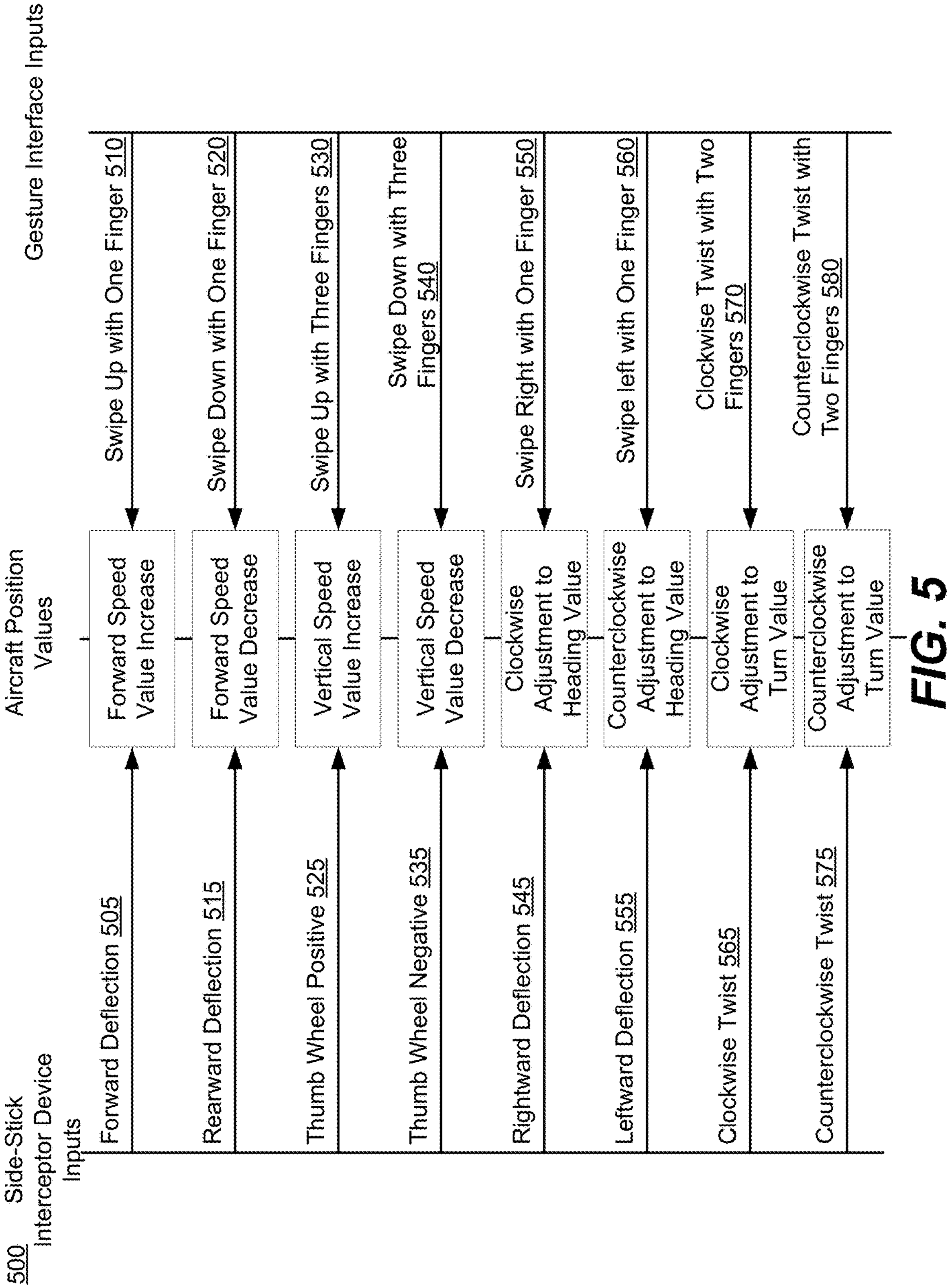
FIG. 5. illustrates one example embodiment of a mapping between universal aircraft control inputs and universal aircraft trajectory values.

FIG. 5 illustrates one embodiment of a mapping 500 between universal aircraft control inputs and universal aircraft trajectory values. For example, the universal aircraft control inputs may be included in the universal aircraft control inputs 330. Similarly, the universal aircraft trajectory values may be determined by the command processing module 365. In the embodiment shown, the mapping 500 maps inputs received from an inceptor device (e.g., the inceptor device 240) and a gesture interface (e.g., the gesture interface 220) to corresponding aircraft trajectory values. The inceptor device is configured for forward, rearward, rightward, and leftward deflection and clockwise and counterclockwise twists, and includes a thumbwheel that can receive positive or negative adjustment. The gesture interface is configured to receive single, double, and triple finger touch inputs. The mapping 500 is intended for the purpose of illustrations only, and other mappings may map inputs received from the same or different interfaces to fewer, additional, or different universal aircraft trajectory values.

As depicted in FIG. 5, a forward deflection 505 of the inceptor device and a swipe up with one finger 510 on the gesture interface both map to a forward speed value increase. A rearward deflection 515 of the inceptor device and a swipe down with one finger 520 on the gesture interface both map to a forward speed value decrease. A thumb wheel positive input 525 on the inceptor device and a swipe up with three fingers 530 on the gesture interface both map to a vertical rate value increase. A thumb wheel negative input 535 on the inceptor device and a swipe down with three fingers 540 on the gesture interface both map to a vertical rate value decrease. A rightward deflection 545 of the inceptor device and a right swipe with one finger 550 on the gesture interface both map to a clockwise adjustment to a heading value. A leftward deflection 555 of the inceptor device and a left swipe with one finger 560 on the gesture interface both map to a counterclockwise adjustment to a heading value. A clockwise twist 565 of the inceptor device and a clockwise twist with two fingers 570 on the gesture interface both map to a clockwise adjustment to a turn value. A counterclockwise twist 575 of the inceptor device and a counterclockwise twist with two fingers 580 on the gesture interface both map to a counterclockwise adjustment to a turn value.

As described above with reference to the universal vehicle control interfaces 110, the mapping 500 may adjust according to a phase of operation of the aircraft. For instance, the rightward deflection 545 and the swipe right with one finger 550 may map to a lateral movement for a rotorcraft (e.g., a strafe) if the rotor craft is hovering. Similarly, the rightward deflection 545 and the swipe right with one finger 550 may be ignored for a fixed-wing aircraft if the fixed-wing aircraft is grounded.

Figure 6A:
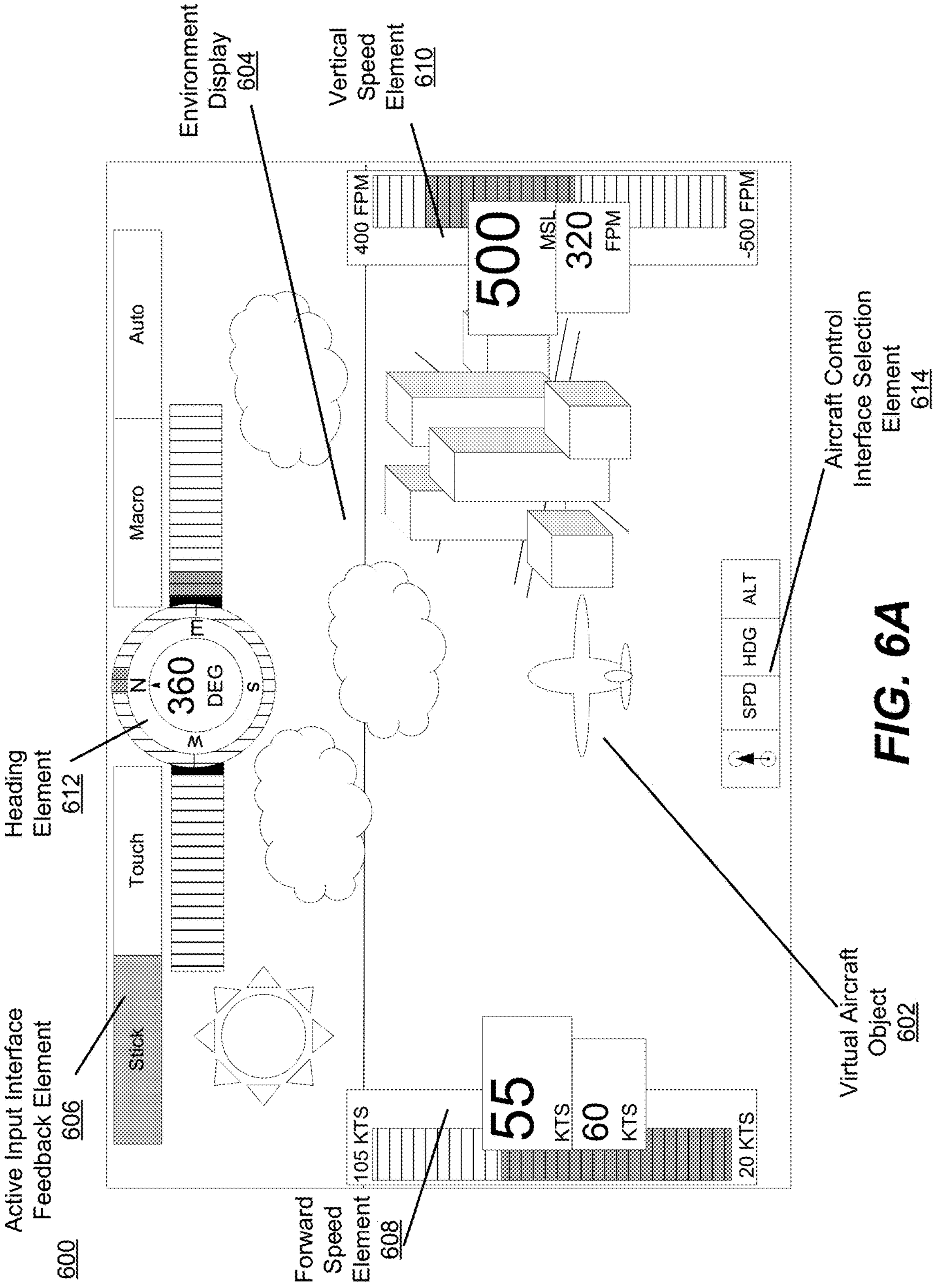
FIG. 6A illustrates one example embodiment of a first aircraft state interface.

FIG. 6A illustrates one embodiment of a first aircraft state interface 600. The aircraft state interface 600 may be an embodiment of a universal vehicle control interface 110 provided by the vehicle control and interface system 100. For example, the aircraft state interface 600 may be an embodiment of an interface displayed by the vehicle state display 230, such as the multi-function interface 220. In other cases, the aircraft state interface 600 may be provide for display on a virtual reality (VR) or augmented reality (AR) headset, overlaying a portion of the windshield of an aircraft, or any other suitable display mechanism.

In the embodiment shown, the aircraft state interface 600 includes a visualization of a virtual aircraft object 602 representative of a state of a physical aircraft. As depicted in FIG. 6A the virtual aircraft object represents a fixed-wing aircraft (e.g., an airplane), such as if the physical aircraft is a fixed-wing aircraft. In other cases, the virtual aircraft object 602 may represent other aircraft, vehicles, or other suitable objects or shapes (e.g., an arrow). The virtual aircraft object 602 may be adjusted (e.g., by the vehicle control and interface system 100) based on changes to the state of the physical aircraft. For example, responsive to determining that the physical aircraft is turning left, the vehicle control and interface system 100 may adjust the display of the virtual aircraft object 602 to visualize a left turn. In this way, the aircraft state interface 600 can provide visual feedback to a human operator of the visual aircraft. In some cases the virtual aircraft object 602 is displayed in a fixed location (e.g., illustrating or excluding orientation) with the surroundings continuously shifting relative to the aircraft (e.g., fixed aircraft position 3rd person view), or the display of the virtual aircraft object 602 can move relative to the surroundings (e.g., over a map, over a ground track, over a rendered environment, within a predetermined deviation from a central position, etc.). Additionally, or alternatively, the virtual aircraft object 602 may not be included in the aircraft state interface 600 and the aircraft state interface 600 can instead, e.g., depict a first-person view (e.g., mimicking the view out of the cockpit) of the environment display 604, as described below.

The aircraft state interface 600 further includes an environment display 604. The environment displays 604 represents a physical environment in which the physical aircraft is operating. As depicted in FIG. 6A, the environment display 604 includes a rendering of various environmental features, for example, a sun position, clouds position, building locations, and a ground plane. The features of the physical environment 604 may be virtually rendered using various techniques, such as using virtual objects, augmented reality (e.g., map or satellite images), or some combination thereof. In some embodiments, the environment display 604 is augmented with virtual objects to convey various information to a human operator of the physical aircraft. For instance, the environment display 604 can include a forecasted flightpath for the physical aircraft or a set of navigational targets delineating a planned flightpath for the physical aircraft, as described in greater detail below with reference to FIGS. 6B and 6C. The environment display 604 can additionally or alternatively include other visual elements.

In some embodiments, the vehicle control and interface system 100 generates the environment display 604 based on a computer vision pose of the physical aircraft (e.g., of the current aircraft conditions, global aircraft position or orientation). The pose can be determined based on GPS, odometry, trilateration from ground fiducials (e.g., wireless fiducials, radar fiducials, etc.), or other signals. The vehicle control and interface system 100 may generate the environment display 604 from suitable terrain database, map, imaging or other sensor data generated by the physical aircraft, or other suitable data. As an example, the vehicle control and interface system 100 may select a map segment using the aircraft pose, determine an augmented field of view or perspective, determine augmented target placement, determine pertinent information (e.g., glideslope angle), determine a type of virtual environment (e.g., map vs rendering), or any other suitable information based on the pose of the physical aircraft. The environment display 604 can be pre-rendered, rendered in real time (e.g., by z-buffer triangle rasterization), dynamically rendered, not rendered (e.g., 2D projected image, skin, etc.) or otherwise suitably generated relative to the view perspective.

The aircraft state interface 600 further includes a set of interface elements overlaying the environment display 604. The set of interface elements include an active input feedback interface element 606, a forward speed element 608, a vertical speed element 610, a heading element 612, and an aircraft control interface selection element 614.

The active input feedback interface element 608 indicates an aircraft interface that is currently providing aircraft control inputs, such as one of the aircraft interfaces 305. As depicted in FIG. 6A, a side-stick inceptor device (e.g., the side-stick inceptor device 240) is currently providing input, as indicated by the grey highlight of the box labeled "stick."

The forward speed element 608, the vertical speed element 610, and the heading element 612 each include information indicating a current aircraft control input value and information indicating a respective value for a current state of the aircraft.

In particular, the forward speed element 608 includes a vertical bar indicating a possible forward speed input value range from 20 knots (KTS) to 105 knots, where the grey bar indicates a current forward speed input value of 60 KTS. The forward speed element 608 also includes a bottom text box including text indicating the current forward speed input value. Further, the forward speed element 608 includes a top text box indicating a current forward speed value for the aircraft of 55 KTS.

Similar to the forward speed element 608, the vertical speed element 610 includes a vertical bar indicating a possible vertical speed input value range from −500 feet per minute (FPM) to 500 to 400 FPM, where the grey bar indicates a current vertical speed input value of 320 FPM. The vertical speed element 610 also includes a bottom text box including text indicating the current vertical speed input value. Further, the vertical speed element 610 includes a top text box indicating a current altitude value for the aircraft of 500 feet above mean sea level (MSL).

The heading element 612 includes a virtual compass surrounded by a circular bar indicating a possible heading input value range from −360 degrees (DEG) to +360 DEG. where the grey bar indicates a current heading input value of +5 DEG. The heading element 612 further includes horizontal bars on either side of the circular bar indicating the range of possible heading input values and a grey bar indicating the current heading input value. The virtual compass of the heading element 612 indicates a current heading value for the aircraft of 360 DEG.

The aircraft control interface selection element 614 facilitates selection of an aircraft control interface from a set of four aircraft control interfaces. As depicted in FIG. 6A, the set of aircraft control interfaces 614 include aircraft control interfaces that can receive through the aircraft state interface 600 or another digital interface. In particular, the set of aircraft control interfaces include a gesture interface for receiving gesture touch inputs (as indicated by an interface element including an icon illustrating a single finger upward swipe), a forward speed macro for receiving a requested aircraft forward speed (as indicated by an interface element labeled "SPD"), a heading macro for receiving a requested aircraft heading (as indicated by an interface element labeled "HDG"), and an altitude macro for receiving a requested aircraft altitude (as indicated by an interface element labeled "ALT"). As an example, a user of the aircraft state interface 600 may select from the set of aircraft control interfaces by via touch inputs (e.g., taps) on the respective interface elements).

In some embodiments, the aircraft state interface 600 or another interface may display additional interface elements corresponding to a selected aircraft control interface from the set of aircraft control interfaces. For example, if the gesture interface is selected the aircraft state interface 600 may display an additional interface including illustrations of the gesture touch inputs for providing universal aircraft control inputs, such as illustrations similar to those depicted in FIG. 4. Similarly, if the forward speed, heading or altitude macro are selected the aircraft state interface 600 may display respective additional interfaces including interface elements for receiving information describing a requested aircraft state, such as a requested forward velocity, a requested heading, or a requested altitude, respectively. In one embodiment, the aircraft state interface 600 displays the additional interfaces corresponding to a selected aircraft control interface in a drop-down interface extending below the aircraft state interface 600 as depicted in FIG. 6A.

Figure 6B:
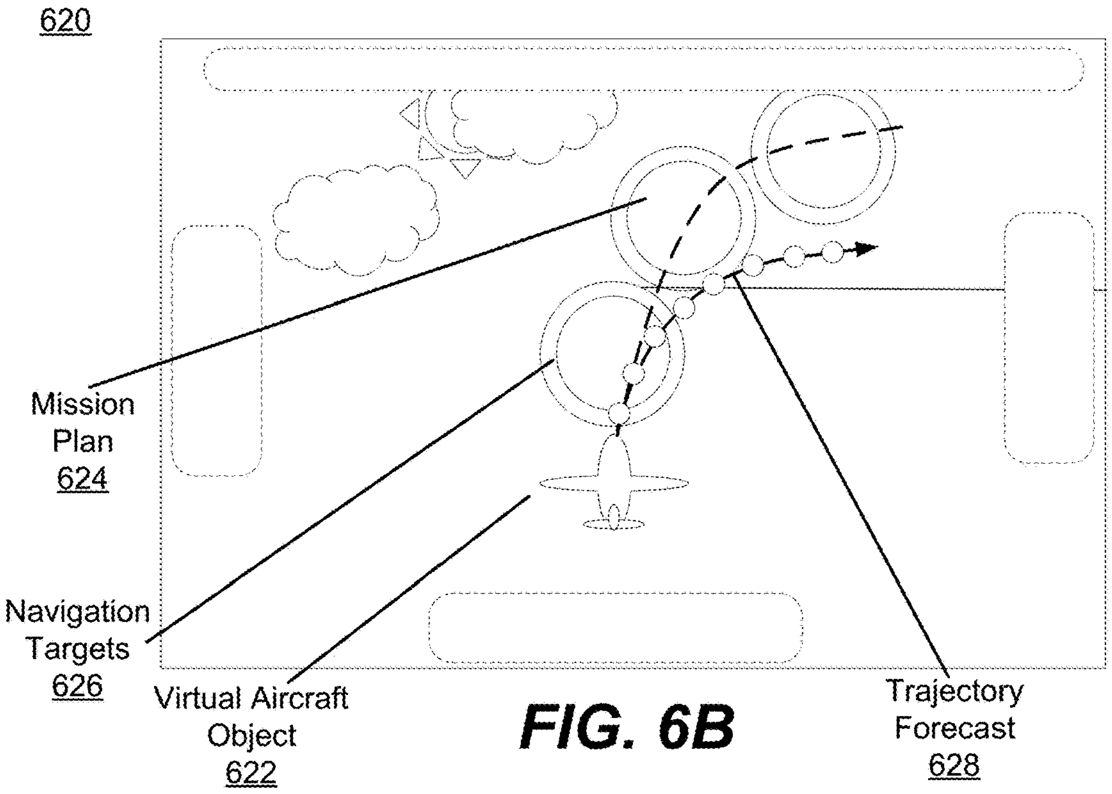
FIG. 6B illustrates one example embodiment of a second aircraft state interface.

FIG. 6B illustrates one embodiment of a second aircraft state interface 620. As with the aircraft state interface 600, the aircraft state interface 620 may be an embodiment of a universal vehicle control interface 110 provided by the vehicle control and interface system 100. Also similar to the aircraft state interface 600, the aircraft state interface 620 includes a virtual aircraft object 622, an environment display, and various interface elements (as indicated by the dashed rectangles). As such, the description of these features of the aircraft state interface 600 are also applicable to these features of the aircraft state interface 620.

As depicted in FIG. 6B, the aircraft state interface 620 additionally includes a set of virtual objects augmenting the environment display to facilitate navigation of a physical aircraft corresponding to the virtual aircraft object 622. The set of virtual objects includes a mission plan 624, navigation targets 626, and a trajectory forecast 628. The mission plan 624 indicates a current mission plan for the physical aircraft in the environment display, such as a mission to navigate the aircraft from a starting location to a target location. In particular, the mission plan 624 is a 3D line indicating a flight path for achieving the mission plan. The navigation targets 626 are 3D rings along the mission plan 624 providing visual checkpoints for following the mission plan 624. For example, the navigation targets 626 may be suitable for zero-visibility situations (e.g., while the physical aircraft is in a cloud, in fog, at night, during a storm, etc.), where conventional visual cues are otherwise unavailable to the operator. Other examples of navigation targets 626 may be gates, annulus, torus, hoops, disks, or any other suitable shape indicating a discrete checkpoint. The trajectory forecast 628 indicates a current trajectory of the physical aircraft in the environment display based on a current state of the physical aircraft. For example, a human operator of the aircraft may deviate from the mission plan 624 by controlling one or more universal input vehicle controllers (e.g., the gesture interface 320 or the stick inceptor device 315). In this way, the trajectory forecast 628 provides visual feedback to the human operator to indicate the result of universal control inputs on a trajectory of the aircraft. The vehicle control and interface system 100 may determine the trajectory forecast 628 in consideration of current wind conditions for the physical aircraft. In different flight phases of the aircraft, additional indicators may appear to help a human operator of the physical aircraft provide inputs for efficient takeoffs or landings.

In alternative embodiments than those depicted in FIG. 6B, the trajectory forecast 628 includes a ground trajectory visualization in addition or alternatively an air trajectory visualization similar to the trajectory forecast 628 depicted in FIG. 6B. For example, the ground trajectory visualization and the air trajectory visualization may parallel lines extending out from the virtual aircraft object 622 and projecting along the ground and into the air of the environment display of the aircraft state interface 620, respectively.

Figure 6C:
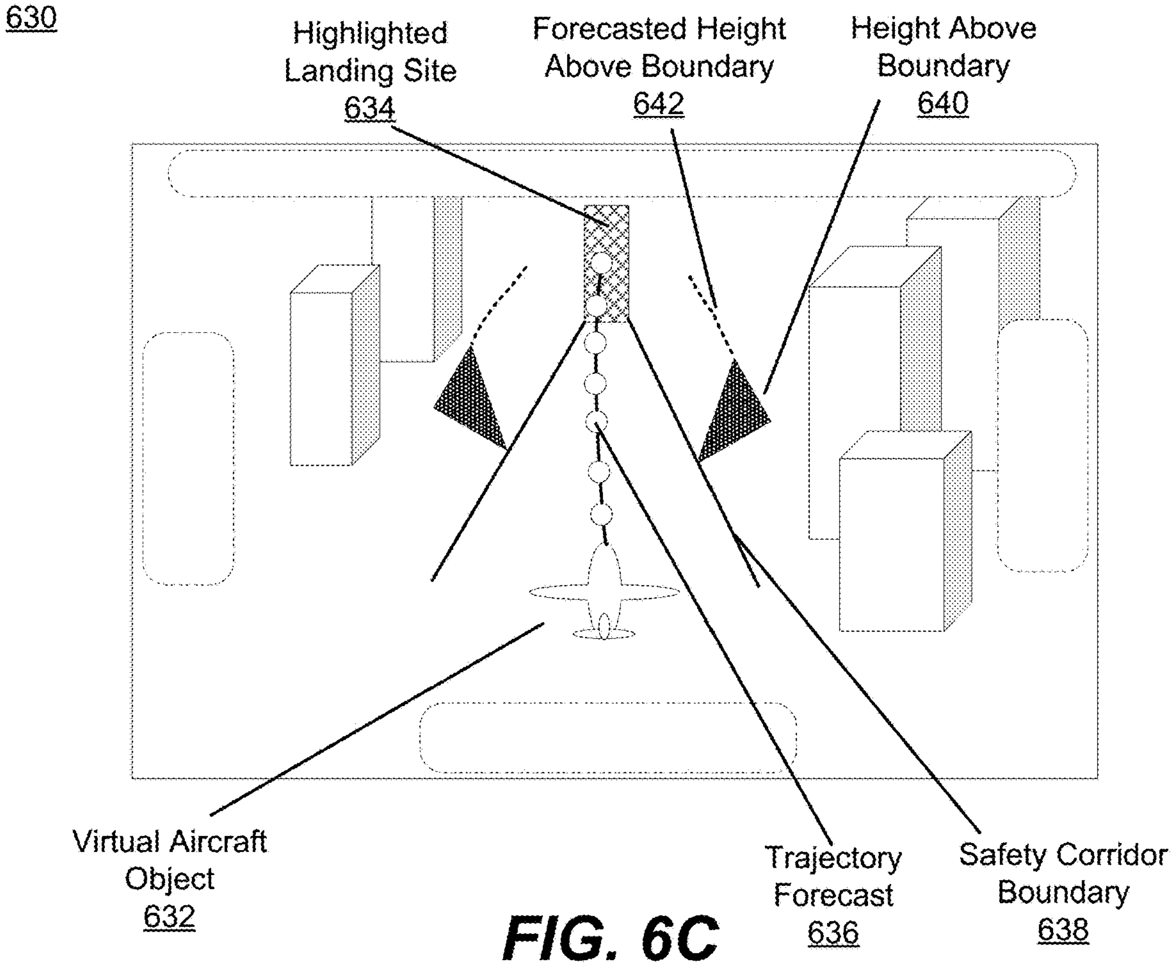
FIG. 6C illustrates one example embodiment of a third aircraft state interface.

FIG. 6C illustrates one embodiment of a third aircraft state interface 630. As with the aircraft state interfaces 600, the aircraft state interface 630 may be an embodiment of a universal vehicle control interface 110 provided by the vehicle control and interface system 100. Also similar to the aircraft state interface 630, the aircraft state interface 630 includes a virtual aircraft object 632, an environment display, and various interface elements. As such, the description of these features of the aircraft state interface 600 are also applicable to these features of the aircraft state interface 650.

As depicted in FIG. 6C, the aircraft state interface 640 additionally includes a set of virtual objects augmenting the environment display to facilitate a landing of a physical aircraft corresponding to the virtual aircraft object 632. The set of virtual objects includes a highlighted landing site 634, a trajectory forecast 636, a safety corridor boundary 638, a height above boundary 640, and a forecasted height above boundary 642. The highlighted landing site 634 indicates a location in the environment display corresponding to a physical landing site for the physical aircraft, such as a landing site selected by an operator of the physical aircraft via the aircraft state interface 630. As with the trajectory forecast 628, the trajectory forecast 636 indicates a current trajectory of the physical aircraft in the environment display based on a current state of the physical aircraft. As depicted in FIG. 6C, the trajectory forecast 636 indicates that the physical aircraft is on a trajectory to land at the highlighted landing site 634. The safety corridor boundary 6638 provides a visual indication in the environment display of a corridor within which the physical aircraft can safely navigate. The height above boundary 640 indicates a minimum altitude as a triangular wall projected onto a surrounding terrain topography (e.g., the buildings on either side of the safety corridor boundary 638). Similarly, the forecasted height above boundary 642 indicates a forecasted minimum altitude as a line extending away from the height above boundary 640 in the direction the virtual aircraft object 632 is directed to. More generally, the vehicle control and interface system 100 can determine or display boundaries corresponding to lane-lines, tunnels (e.g., wireframe), virtual 'bumpers,' translucent 'walls' or other suitable boundaries. Such boundary interface elements can provide improved awareness or visualization relative to a 'path' in 3D-space, since it can be easier for an operator to interpret the relative location of a discrete target (or stay within a lane in the continuous case) than to track to a point, line, or curve in 3D space—which can be difficult for a user to parse on a 2D screen even from a perspective view.

Figure 6D:
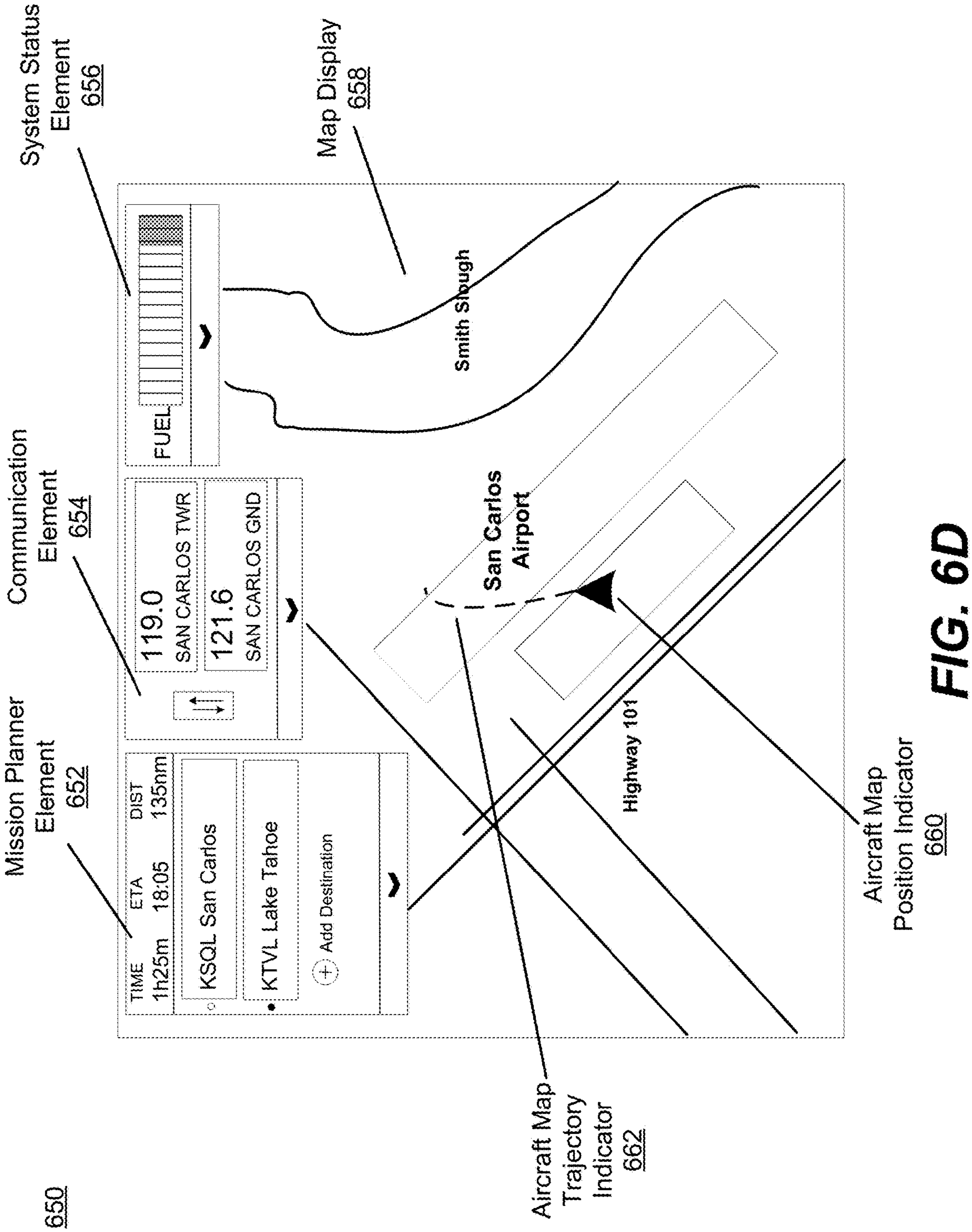
FIG. 6D illustrates one example embodiment of a fourth aircraft state interface.

FIG. 6D illustrates one embodiment of a fourth aircraft state interface 650. The aircraft state interface 650 may be an embodiment of a universal vehicle control interface 110 provided by the vehicle control and interface system 100. For example, the aircraft state interface 650 may be an embodiment of the multi-function interface 220. As depicted in FIG. 6D, the aircraft state interface 650 includes a mission planner element 652, a communication element 654, a system health element 656, a map display 658, an aircraft map position 660, and an aircraft map trajectory 662.

The mission planner element 652 facilitates interaction with navigation information, such as a routing database, inputting an origin or destination location, selecting intermediary waypoints, etc. As depicted in FIG. 6D, the mission planner element 652 includes information describing a route including two destinations (KSQL San Carlos and KTVL Lake Tahoe). The mission planner element 652 further includes route statistics (e.g., time to destination, estimated time of arrival (ETA), and distance to destination). In other cases the mission planner element 652 may include other metadata about the route (e.g., scenic characteristics, relative length, complexity, etc.). In some embodiments, the mission planner element 652 includes information describing available destination locations, such as fueling or weather conditions at or on the way to a destination location.

The communication element 654 includes information describing relevant radio frequencies. For instance, the relevant radio frequencies may be based on a current position of the aircraft, a current mission for the aircraft, or other relevant information. In the same or different embodiments, the communication element 654 may include other communication-related information.

The system status element 656 includes information describing a status of the aircraft determined according to an estimated state of the aircraft (e.g., the estimated aircraft state 340). As depicted in FIG. 6D, the internal system status element 656 includes an indicator of a current fuel level for the aircraft. The system status element may display a status for a particular component of the aircraft responsive to the status meeting a threshold indicating the status is pertinent. In this way, the system status element 656 may dynamically provide notifications describing a component status to an operator of the vehicle after it becomes pertinent. For example, the current fuel level may be displayed on the system status element 656 responsive to the estimated state of the aircraft indicating the fuel level has dropped below a threshold fuel level. Other indicators the internal system status element 656 may include are indicators describing powerplant data, manifold pressure, cylinder head temperature, battery voltage, inceptor status, etc. In some cases, a full or partial list of aircraft component status may be accesses as a dropdown menu by interacting with the downward arrow on the system status element 656.

In some embodiments, some or all of the mission planner element 652, the communication element 654, or the system health element 656 are not persistently included on the aircraft state interface 650. Instead, the aircraft interface 650 is adjusted (e.g., by the vehicle control and interface system 100) to include some or all of these elements in response to triggers or events. In the same or different embodiments, the mission planner element 652, the communication element 654, or the system health element 656 are not persistently included on the aircraft state interface 650 include pertinent information. Pertinent information represents a limited set of information provided for display to the human operator at a particular time or after a particular event. For example, a human operator can be relied upon to process information or a direct attention according to a prioritization of: 1. aviate; 2. navigate; and 3. communicate. As only a subset of information describing a state of the physical aircraft is required for each of these tasks, the human operator can achieve these tasks more efficiently if pertinent information is displayed and irrelevant information is not displayed, which can be extraneous or distracting for the human operator. Pertinent information can include various apposite parameters, notifications, values, type of visual augmentation (e.g., two dimensional (2D), two and a half dimensional (2.5D), three dimensional (3D), augmentation mode, virtual environment.

The map display 658 is a virtual geographical map including an aircraft map position indicator 660 and an aircraft map trajectory indicator 662. The map display 658 includes virtual geographical data for a geographical region. The map display 658 may be generated using map data from various map databases. The aircraft map trajectory indicator 660 provides a visual indication of a geographical location of the aircraft relative to the geographical region displayed by the map display 658. Similarly, the aircraft map trajectory indicator 662 provides a visual indication of a trajectory of the aircraft in the geographical region of the map display 658. For example, the aircraft map trajectory 662 may be a 2D projection of the trajectory forecasts 628 or 636.

The particular interface elements depicted in FIGS. 6A-6D are selected for the purpose of illustration only, and one skilled in the art will appreciate that the interfaces 600, 620, 630, and 650 can include fewer, additional, or different interface elements arranged in the same or different manner.

Example Process for Converting Universal Control Inputs to Vehicle Commands

FIG. 7 is a flow diagram illustrating one embodiment of a process 700 for generating actuator commands for aircraft control inputs via an aircraft control router. In the example embodiment shown, the aircraft control router is illustrated performing the steps of the process 700. However, some or all of the steps may be performed by other entities or components. In addition, some embodiments may perform the steps in parallel, perform the steps in different orders, or perform different steps. The aircraft control router may be an embodiment of the universal vehicle control router 120, such as the universal aircraft control router 310. Furthermore, the aircraft control router may be integrated with one or more computer systems, such as the computer system 700 described above with reference to FIG. 7.

The process 700 includes the aircraft control router, e.g., 310, receiving 710 aircraft control inputs describing a requested trajectory for an aircraft from. For example, a human operator of an aircraft may provide the aircraft control inputs via one of the aircraft interfaces 305. The aircraft control inputs may include one or more of a forward speed control input, a lateral speed control input, a vertical speed control input, or a turn control input, e.g., as described above with reference to FIGS. 4 and 5.

The process 700 includes the aircraft control router, e.g., 310, generating 720, using the aircraft control inputs, a plurality of trajectory values for axes of movement of the aircraft, the plurality of trajectory values corresponding to the requested trajectory. For instance, the aircraft control router may convert the aircraft control inputs to corresponding trajectory values for axes of movement of the aircraft. As an example, if the aircraft control inputs include some or all of a forward speed control input, a lateral speed control input, a vertical speed control input, or a turn control input, the aircraft control router may determine one or more of a corresponding aircraft x-axis velocity, aircraft y-axis velocity, aircraft z-axis velocity, or angular velocity about a yaw axis of the vehicle (e.g., a yaw).

The process 700 includes the aircraft control router generating 730, using information describing characteristics of the aircraft and the plurality of trajectory values, a plurality of actuator commands to control the plurality of actuators of the aircraft. The aircraft control router may apply a set of control laws to the plurality of trajectory values in order to determine allowable trajectory values for the axis of movement of the aircraft. The information describing characteristics of the aircraft may include various information, such as a model including parameters for the aircraft or an estimated state of the aircraft. Furthermore, the aircraft control router may convert the plurality of trajectory values to the plurality of actuator commands using one or both of an outer processing loop and an inner processing loop, as described above with reference to the universal aircraft control router 310.

The process 700 includes the aircraft control router transmitting 740 the plurality of actuators commands to corresponding actuators to adjust a current trajectory of the aircraft to the requested trajectory. Alternatively, or additionally, the aircraft control router may transmit some or all of the actuator commands to other components of the aircraft to be used to control relevant actuators.

Computing Machine Architecture

Figure 17:
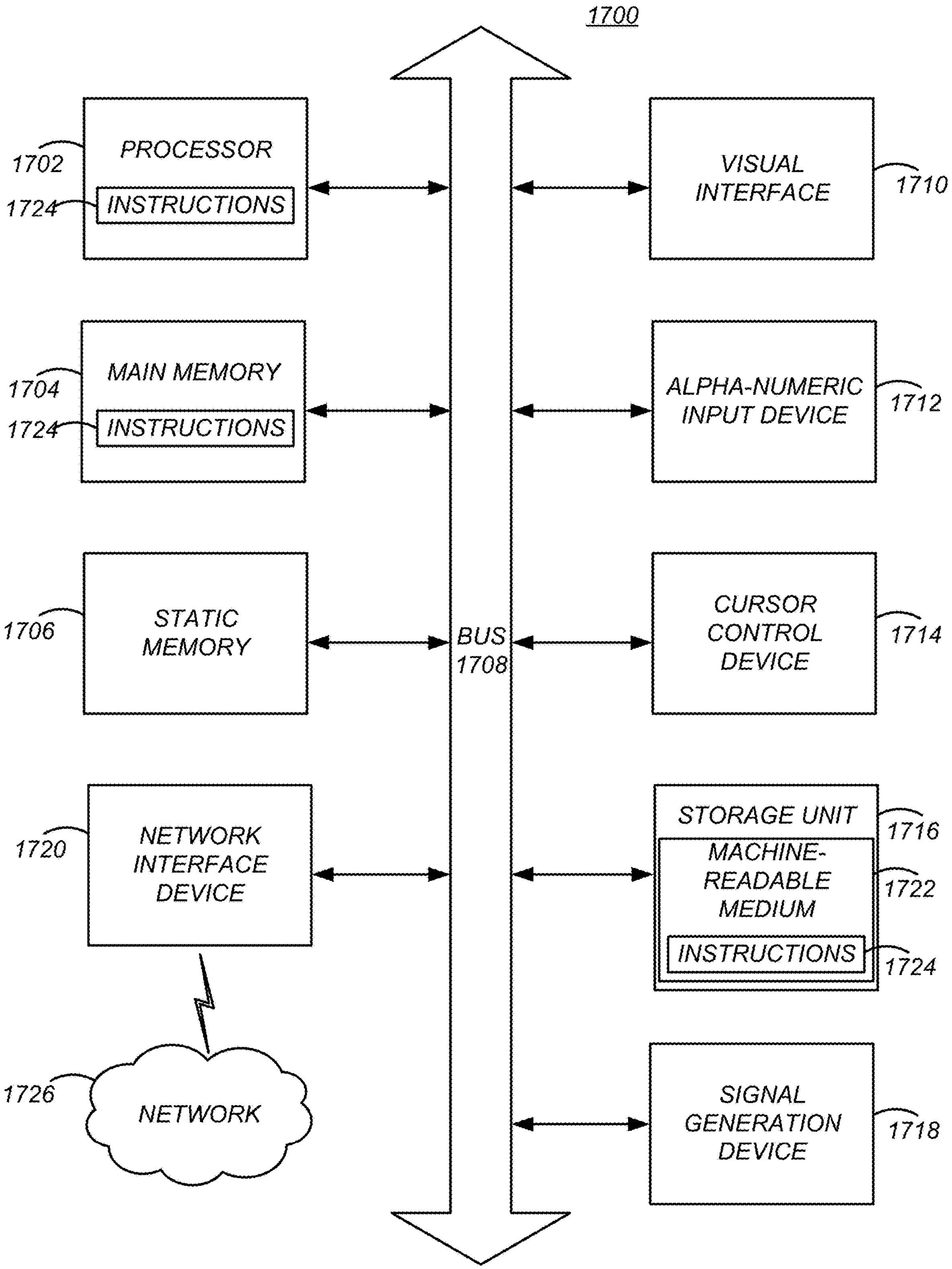
FIG. 17 is a block diagram illustrating one example embodiment of components of an example machine able to read instructions from a machine-readable medium and execute them in a processor (or controller).

FIG. 17 is a block diagram illustrating one embodiment of components of an example machine able to read instructions from a machine-readable medium and execute them in a processor (or controller). Specifically, FIG. 17 shows a diagrammatic representation of a machine in the example form of a computer system 1700 (also "computing system 1700") within which program code (e.g., software) for causing the machine to perform any one or more of the methodologies discussed herein may be executed. The computer system 1700 may be used for one or more components of the vehicle control and interface system 100 depicted and described with respect to FIGS. 1-16. The program code may be comprised of instructions 1724 executable by a set of one or more processors 1702 (e.g., who execute the instructions individually or collectively) of the computer system 1700. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 1724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 1700 includes a set of one or more processors 1702 (e.g., including one or more central processing units (CPUs), one or more graphics processing units (GPUs), one or more digital signal processors (DSPs), one or more application specific integrated circuits (ASICs), one or more radio-frequency integrated circuits (RFICs), one or more field programmable gate arrays (FPGAs), or some combination thereof), a main memory 1704, and a static memory 1706, which are configured to communicate with each other via a bus 1708. The computer system 1700 may further include visual display interface 1710. The visual interface may include a software driver that enables (or provide) user interfaces to render on a screen either directly or indirectly. The visual interface 1710 may interface with a touch enabled screen. The computer system 1700 may also include input devices 1712 (e.g., a keyboard a mouse), a storage unit 1716, a signal generation device 1718 (e.g., a microphone and/or speaker), and a network interface device 1720, which also are configured to communicate via the bus 1708.

The storage unit 1716 includes a machine-readable medium 1722 (e.g., magnetic disk or solid-state memory) on which is stored instructions 1724 (e.g., software) embodying any one or more of the methodologies or functions described herein. The instructions 1724 (e.g., software) may also reside, completely or at least partially, within the main memory 1704 or within the processor 1702 (e.g., within a processor's cache memory) during execution.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Some embodiments are described herein as including logic or a number of components, modules, or mechanisms. Modules may constitute either software modules (e.g., code embodied on a machine-readable medium and processor executable), hardware modules, or some combination thereof. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of operating an aircraft flying through an environment, wherein a component of the aircraft is malfunctioning, the method comprising:

receiving sensor data from one or more sensors of the aircraft;

determining a state of the aircraft based on the received sensor data, wherein the state of the aircraft is a degraded flight state due to the component that is malfunctioning; and operating the aircraft according to the degraded flight state, wherein operating the aircraft according to the degraded flight state comprises:

modifying one or more processing control loops based on the degraded flight state, the one or more processing control loops configured to generate actuator commands according to a flight state of the aircraft and signals based on inputs from vehicle control interfaces; and generating an actuator command by applying the degraded flight state and a signal based on an input from a vehicle control interface to the modified one or more processing control loops.

2. The method of claim 1, wherein operating the aircraft according to the degraded flight state does not change how a pilot of the aircraft interacts with the vehicle control interface.

3. The method of claim 1, wherein:

a pilot of the aircraft interacts with the vehicle control interface to control the aircraft, and generation of the actuator commands enables the pilot to continue interacting with the vehicle control interface during the degraded flight state in the same way as during a non-degraded flight state.

4. The method of claim 1, wherein modifying the one or more processing control loops comprises modifying an outer processing loop configured to apply a set of control laws to aircraft trajectory values based on inputs from the vehicle control interface, the outer processing loop outputting allowable aircraft trajectory values according to the set of control laws.

5. The method of claim 4, wherein the set of control laws are selected from sets of control laws according to the degraded flight state of the aircraft.

6. The method of claim 1, wherein modifying the one or more processing control loops comprises turning off a portion of a processing loop based on the component that is malfunctioning.

7. The method of claim 1, wherein modifying the one or more processing control loops comprises modifying an inner processing loop cascaded after an outer processing loop, the inner processing loop configured to convert aircraft trajectory values based on inputs from the vehicle control interface to the actuator commands.

8. The method of claim 7, wherein modifying the inner processing loop comprises turning off an integrator.

9. The method of claim 1, wherein modifying the one or more processing control loops based on the degraded flight state comprises modifying a loop based on the component that is malfunctioning.

10. The method of claim 1, wherein modifying the one or more processing control loops based on the degraded flight state comprises turning off a controller in the one or more processing control loops, the controller configured to provide control along an axis of the aircraft.

11. The method of claim 1, wherein:

the component that is malfunctioning is a first sensor;

data from the first sensor is used by a first portion of a processing control loop of the one or more processing control loops to determine a result; and modifying the one or more processing control loops comprises:

turning off the first portion of the processing control loop; and turning on a second portion of the processing control loop, the second portion of the processing control loop configured to determine the result using data from a second sensor different than the first sensor.

12. The method of claim 1, wherein the component that is malfunctioning is at least one of a sensor, an actuator, or an airframe component of the aircraft.

13. The method of claim 1, wherein the signal is an aircraft trajectory value generated according to the degraded flight state and the input from the vehicle control interface.

14. The method of claim 1, wherein prior to the aircraft in the degraded flight state, the aircraft is in a non-degraded flight state.

15. A non-transitory computer readable storage medium comprising instructions that, when executed by a computing system, cause the computing system to perform operations comprising:

receiving sensor data from one or more sensors of an aircraft, wherein a component of the aircraft is malfunctioning;

determining a state of the aircraft based on the received sensor data, wherein the state of the aircraft is a degraded flight state due to the component that is malfunctioning; and operating the aircraft according to the degraded flight state, wherein operating the aircraft according to the degraded flight state comprises:

modifying one or more processing control loops based on the degraded flight state, the one or more processing control loops configured to generate actuator commands according to a flight state of the aircraft and signals based on inputs from vehicle control interfaces; and generating an actuator command by applying the degraded flight state and a signal based on an input from a vehicle control interface to the modified one or more processing control loops.

16. The non-transitory computer readable storage medium of claim 15, wherein the operating the aircraft according to the degraded flight state does not change how a pilot of the aircraft interacts with the vehicle control interface.

17. The non-transitory computer readable storage medium of claim 15, wherein:

a pilot of the aircraft interacts with the vehicle control interface to control the aircraft, and generation of the actuator commands enables the pilot to continue interacting with the vehicle control interface during the degraded flight state in the same way as during a non-degraded flight state.

18. The non-transitory computer readable storage medium of claim 15, wherein modifying the one or more processing control loops comprises modifying an outer processing control loop configured to apply a set of control laws to aircraft trajectory values based on inputs from the vehicle control interface, the outer processing control loop outputting allowable aircraft trajectory values according to the set of control laws.

19. The non-transitory computer readable storage medium of claim 18, wherein the set of control laws are selected from sets of control laws according to the degraded flight state of the aircraft.

20. A system comprising:

a set of one or more processors; and a computer readable storage medium comprising instructions that, when executed by the set of one or more processors, cause the set of one or more processors to perform operations comprising:

receiving sensor data from one or more sensors of an aircraft, wherein a component of the aircraft is malfunctioning;

determining a state of the aircraft based on the received sensor data, wherein the state of the aircraft is a degraded flight state due to the component that is malfunctioning; and operating the aircraft according to the degraded flight state, wherein operating the aircraft according to the degraded flight state comprises:

modifying one or more processing control loops based on the degraded flight state, the one or more processing control loops configured to generate actuator commands according to a flight state of the aircraft and signals based on inputs from vehicle control interfaces, wherein:

modifying the one or more processing control loops comprises modifying an outer processing control loop configured to apply a set of control laws to aircraft trajectory values based on inputs from the vehicle control interface, the outer processing control loop outputting allowable aircraft trajectory values according to the set of control laws; and the set of control laws are selected from sets of control laws according to the degraded flight state of the aircraft; and generating an actuator command by applying the degraded flight state and a signal based on an input from a vehicle control interface to the modified one or more processing control loops.

* * * * *